US005883981A

United States Patent [19]
Li et al.

[11] Patent Number: 5,883,981
[45] Date of Patent: Mar. 16, 1999

[54] LATTICE VECTOR TRANSFORM CODING METHOD FOR IMAGE AND VIDEO COMPRESSION

[75] Inventors: Weiping Li, Bethlehem; Qinghong Cao; Chun Wang, both of Emmaus; Kenneth K. Tzeng, Bethlehem, all of Pa.

[73] Assignee: Competitive Technologies of PA, Inc., Bethlehem, Pa.

[21] Appl. No.: 733,849

[22] Filed: Oct. 18, 1996

Related U.S. Application Data

[60] Provisional application No. 60/005,710 Oct. 20, 1995.
[51] Int. Cl.$^6$ .............................. G06K 9/36; G06K 9/46; G06K 9/38
[52] U.S. Cl. ........................................ 382/253; 382/248
[58] Field of Search ..................... 382/253, 248; 348/414, 417, 403, 405; 375/241, 243, 240; 358/426

[56] References Cited

U.S. PATENT DOCUMENTS

| 5,150,209 | 9/1992 | Baker et al. | 348/407 |
|---|---|---|---|
| 5,436,985 | 7/1995 | Li | 382/253 |
| 5,592,569 | 1/1997 | Li | 382/253 |

OTHER PUBLICATIONS

Barlaud, Michel, et al. "Pyramidal Lattice Vector Quantization For Multiscale Image Coding", IEEE Transactions on Image Processing, vol. 3, No. 4, Jul. 1994, pp. 367–381.
Conway, John H., et al. "A Fast Encoding Method For Lattice Codes and Quantizers", IEEE Transactions on Information Theory, vol. IT–29, No. 6., Nov. 1983, pp. 820–824.
Fischer, Thomas R., "A Pyramid Vector Quantizer", IEEE Transactions on Information Theory, vol. IT–32, No. 4, Jul. 1986, pp. 568–582.
Forney, David G., Jr. "Coset Codes–Part I: Introduction and Geometrical Classification", IEEE Transactions on Information Theory, vol. 34, No. 5, Sep., 1988, pp. 1123–1151.
Forney, David G., Jr. "Coset Codes–Part II: Introduction and Geometrical Classification", IEEE Transactions on Information Theory, vol. 34, No. 5, Sep., 1988, pp. 1152–1187.
Laroia, Rajiv, et al., "A Structured Fixed–Rate Quantizer Derived from a Variable–Length Scalar Quantizer: Part I—Memoryless Sources", IEEE Transactions on Information Theory, vol. 39, No. 3. May 1993, pp. 851–876.
Linde et al. "An Algorithm For Vector Quantizer Design", IEEE Transactions on Communications, vol. Com–28, No. 1, Jan. 1980, pp. 84–95.

*Primary Examiner*—Leo H. Boudreau
*Assistant Examiner*—Dmitry A. Novik
*Attorney, Agent, or Firm*—Martin M. Novak

[57] ABSTRACT

A method is disclosed for encoding and decoding an input signal representative of video or audio information. A form of the encoding includes the following steps: processing the input signal to produce a sequence of vectors representative of the input signal; implementing a lattice vector quantization procedure on individual vectors of the sequence to identify a lattice point of a lattice that is closest to the individual vector and to obtain an index value representative of a labelling of the identified lattice point, the lattice vector quantization procedure including a multi-level allocation of groups of reserved indices, and selection of the index value for the individual vector within a group of reserved indices. The index signals representative of the index values are stored and then recovered for decoding, or transmitted before decoding. The decoding is operative to obtain a recovered sequence of vectors, and the sequence of vectors can be processed to produce an output signal.

8 Claims, 11 Drawing Sheets

LATTICE VECTOR TRANSFORM CODING METHOD FOR IMAGE AND VIDEO COMPRESSION

FIELD OF THE INVENTION

This application claims priority from U.S. Provisional Application Ser. No. 60/005,710, filed Oct. 20, 1995.

The present invention was made with Government support, and the Government has certain rights in the invention.

This invention relates to compression of image-representative signals and, more particularly, to an apparatus and method for encoding and decoding image-representative signals using lattice vector quantization. The apparatus and method hereof can also be used for encoding and decoding other types of signals, for example sound-representative signals.

BACKGROUND OF THE INVENTION

Image-representative signals can be digitized, encoded, and subsequently decoded in a manner which substantially reduces the number of bits necessary to represent a decoded reconstructed image without undue or noticeable degradation in the reconstructed image. Image coding is an essential part of many applications such as digital television transmission, video conferencing, facsimile, image database, etc. The simplest technique for this purpose is pulse code modulation (PCM). A PCM system encodes individual pixels of an image in a memory-less way, i.e., it does not use any correlation information between pixels. An improvement over the PCM technique can be made by taking advantage of the correlations between pixels. Predictive coding is one of the techniques based on this principle. It quantizes the difference between a pixel and a prediction of the pixel from its neighbor pixels. Transform coding is another type of technique based on the same principle. In transform coding, a block of data samples is transformed from the image domain to the transform domain using an orthogonal transform, such as the discrete cosine transform (DCT). Two properties of the transform domain coefficients are used. One is that the transform domain coefficients have fewer correlations than the original data samples so that they can be coded individually. The other property is that the energy is packed into a few lower order coefficients so that many higher order coefficients can be either coded with very few bits or discarded.

All of these techniques perform coding on scalars, either in the image domain or in the transform domain. As Shannon's rate-distortion theory indicates, better performance can be achieved by coding vectors instead of scalars. Many vector quantization (VQ) techniques have been developed. As is known in the art, vector quantization is a technique of coding whereby multidimensional vectors are typically represented by a limited number of code words (the collection of code words sometimes being referred to as a "code book"). If, say, there are only 64 words in the code book, they can be distinguished using only 6 bits. In an example of a particular application, these code words may be used to represent, for instance, 2×2×12 vectors (48 bits). For a given vector to be quantized, the vector quantization technique selects the code word in the code book that is closest (that is, for example, the least different, based on a least squares computation). In the decoding process, the vector represented by the selected code word is used for reconstruction of the original image. For further description vector quantization, reference can be made, for example, to Linde et al., An Algorithm for Vector Quantizer Design, IEEE Transactions on Communications, Vol. Com-28, No. 1, January 1980. Vector quantization had been used on DCT coefficients, but with limitations, since VQ performance is enhanced by the presence of correlation among the components being quantized, and there is inherently low correlation between DCT coefficients. In the U.S. Pat. No. 5,436,985 of Weiping Li, VQ is performed on DCT coefficients using a technique that takes full advantage of attributes of both DCT and VQ.

K-dimensional vector quantization (VQ) is a mapping of a K-dimensional vector x to one of N code-vectors {c(0), c(1), ... C(N−1)}. It involves encoding and decoding. VQ encoding is a mapping of x to an integer index i:

$$i = E(x)$$

VQ decoding is a mapping of the index i to a code-vector c(i):

$$c(i) = D(i)$$

Compression is achieved because transmission or storage of the index i only requires $\log_2(N)$ bits which are much less than the number of bits needed for transmission or storage of this K-dimensional vector x. For a code book without an efficient structure, the VQ encoding mapping of an input vector x to an index i has to be carried out using a look-up table that stores all the code-vectors in a particular order. VQ encoding involves a search of this table to find a code-vector that is closest to the input vector under a distortion measure. The position of this closest code-vector in the table is the index i. In lattice VQ, code-vectors are lattice points in a K-dimensional space. The encoding mapping in lattice VQ does not use a look-up table. The index i can be calculated. For any given input vector x, the encoding process involves two calculations. The first calculation is to find the closest lattice point to the input vector. The second calculation is to find the index of the closest lattice point. The efficiency of labeling lattice points is measured by how many bits are needed to represent the indices of the lattice points within a finite boundary. If $\log_2(N)$ bits are sufficient for representing the indexes of N lattice points within the finite boundary, the labeling method is 100% efficient. Some relatively simple lattices, such as a cubic lattice, can be efficiently labelled using known techniques. However, certain more complex lattices, which are desirable for their excellent densities, pose serious problems of labelling efficiency.

It is among the objects of the present invention to devise a technique and apparatus which is responsive to the limitations of prior lattice vector quantization techniques and which improves labelling efficiency in such techniques.

SUMMARY OF THE INVENTION

In accordance with an embodiment of the invention, there is disclosed a method for encoding and decoding an input signal representative of video or audio information. A form of the method includes encoding that comprises the following steps: processing the input signal to produce a sequence of vectors representative of the input signal; implementing a lattice vector quantization procedure on individual vectors of the sequence to identify a lattice point of a lattice that is closest to the individual vector and to obtain an index value representative of a labelling of the identified lattice point, the lattice vector quantization procedure including a multi-level allocation of groups of reserved indices, and selection of said index value for the individual vector within a group of reserved indices. The index signals representative of said index values are stored and then recovered for decoding (or, for example, transmitted before decoding). The decoding is operative to obtain a recovered sequence of vectors, and the sequence of vectors can be processed to produce an output signal.

In a disclosed embodiment, the vectors are multidimensional and the lattice vector quantization also includes dividing the individual vector into subvectors of its odd and even components, selecting respective index components for the even and odd components, and combining the even and odd index components to obtain the index. In this embodiment, the lattice vector quantization also includes folding the odd subvector component into a vector space having only positive components, processing the folded vector, providing a further group of reserved indices based on the folded vector, and determining the odd index value component from said further group of indices.

Further features and advantages of the invention will become more readily apparent from the following detailed description when taken in conjunction with the accompanying drawings.

DETAILED DESCRIPTION

Figure 1:
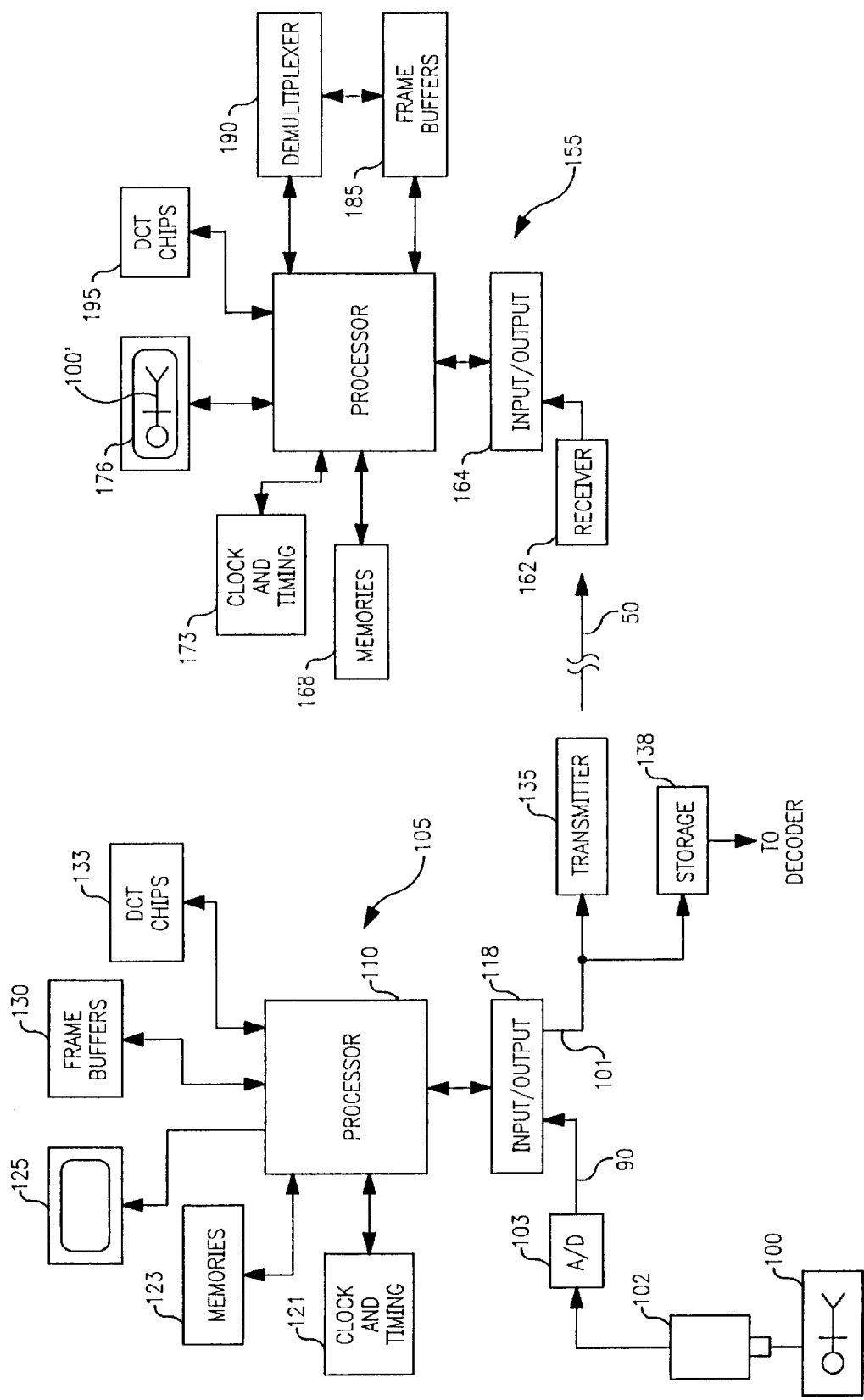
FIG. 1 is a block diagram of an apparatus which can be used in practicing an embodiment of the invention.

Referring to FIG. 1, there is shown a block diagram of an apparatus in accordance with an embodiment of the invention for encoding and decoding an image 100. A scanner or a video camera 102 produces an array of pixel-representative signals that are coupled to an analog-to-digital converter 103, which is, in turn, coupled to the processor 110 of an encoder 105. When programmed in the manner to be described, the processor 110 and its associated circuits can be used to implement an embodiment of the invention and to practice an embodiment of the method of the invention. The processor 110 may be any suitable processor, for example an electronic digital processor or microprocessor. It will be understood that any general purpose or special purpose processor, or other machine or circuitry that can perform the functions described herein, electronically, optically, or by other means, can be utilized. The processor 110, which for purposes of the particular described embodiments hereof can be considered as the processor or CPU of a general purpose electronic digital computer, such as a Model UltraSparc-1 sold by Sun Microsystems, Inc., will typically include memories 123, clock and timing circuitry 121, input/output functions 118 and monitor 125, which may all be of conventional types. In the present embodiment, frame buffers 130, and discrete cosine transform (DCT) chips 133, which may all be of commercially available types, are also coupled with the processor 110.

With the processor appropriately programmed, as described hereinbelow, an encoded output signal 101 is produced which is a compressed version of the input signal 90 and requires less bandwidth and/or less memory for storage. In the illustration of FIG. 1, the encoded signal 101 is shown as being coupled to a transmitter 135 for transmission over a communications medium (e.g. air, cable, fiber optical link, microwave link, etc.) 50 to a receiver 162. The encoded signal is also illustrated as being coupled to a storage medium 138, which may alternatively be associated with or part of the processor subsystem 110, and which has an output that can be decoded using the decoder to be described.

Coupled with the receiver 162 is a decoder 155 that includes a similar processor 160 and associated peripherals and circuits of similar type to those described in the encoder. These include input/output circuitry 164, memories 168, clock and timing circuitry 173, and a monitor 176 that can display a decoded image 100'. Also provided are inverse discrete cosine transform (IDCT) chips 195, frame buffers 185, and a demultiplexer 190, which may all be of commercially available types.

In an exemplary embodiment hereof vector quantization (VQ) is performed on vectors that can, for instance, be obtained using a technique disclosed in the above-referenced U.S. Pat. No. 5,436,985 of Weiping Li. Reference can be made to that Patent for further description. Briefly, the image is subsampled to obtain several subsampled versions of the image, and transformed (using discrete cosine transform) to the transform domain. Vectors are then produced from the DCT coefficients. The vectors can optionally be thresholded and/or otherwise reduced, and vector quantizing is then implemented, for example by using a known code book technique. The vector quantization of the present invention can be performed on the described types of vectors or on any other suitable vectors.

Figure 2:
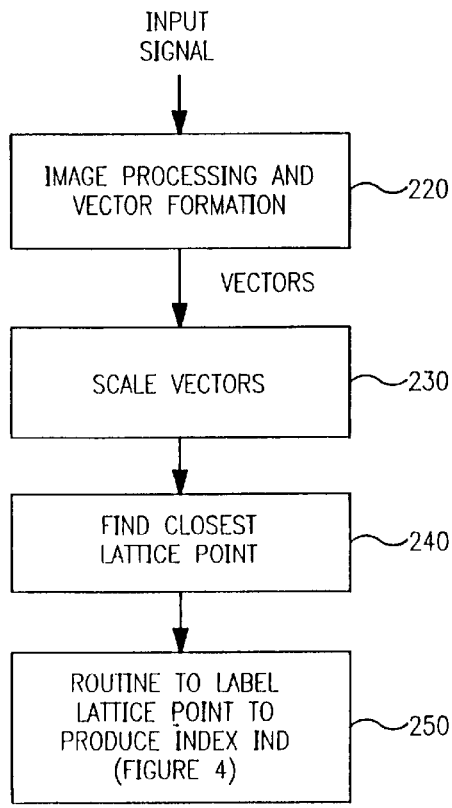
FIG. 2 is a flow diagram of a routine that can be utilized to program the encoder processor in accordance with an embodiment of the invention.

FIG. 2 is a flow diagram of a routine for controlling the processor 110 of encoder 105 to perform encoding in accordance with an embodiment of the invention. It will be understood that some or all of the functions described in terms of programming processor 110 may alternatively be implemented in hardware and specifically designed for speed and/or efficiency of processing. In FIG. 2, the block 220 represents the processing of the received image-representative signals and vector formation, for example in the manner just described. The reduced sequence of vectors can then be scaled, as represented by the block 230. In the present invention, the illustrated vector quantization technique uses a lattice type of vector transform coding, and the basics of lattice techniques are described in the Appendix I, appended hereto, and also in the citations at the end of Appendix I. Examples of the types lattices that can be used in embodiments of the present invention are the so-called "Construction A" lattice $E_8$ or the "Construction B" lattice $\Lambda_{16}$. Reference can be made, for example to pages 5 and 6 of the Appendix for further description of these known lattices. The $E_8$ lattice is given by $$E_8 = (8,4,4) + 2Z^8$$

where the definition of the notation (8,4,4) is set forth at page 6 of Appendix I, and where it is understood that the 8 means that the code words are 8 dimensional, the first 4 means that there are $2^4 = 16$ codewords, and the second 4 indicates a minimum Hamming distance of 4. The notation $Z^8$ represents an eight dimensional cubic lattice, and the notation $2Z^8$ represents the even points thereof. In an illustrated embodiment hereof the lattice has a pyramid boundary.

Referring again to FIG. 2, the block 240 represents the determination, for a given scaled vector, of the closest lattice point. This can be implemented in known fashion, for example by using the routine described by G. D. Forney in "Coset Codes—Part II", IEEE Transactions On Information Theory, September, 1988. The block 250 is then entered, this block representing the routine to label the previously determined lattice point to produce an index designated IND, and this technique involves improvements in accordance with an embodiment of the invention. The routine therefor is described in conjunction with the flow diagram of FIG. 4, and the subsidiary flow diagrams referred to therein.

Figure 3:
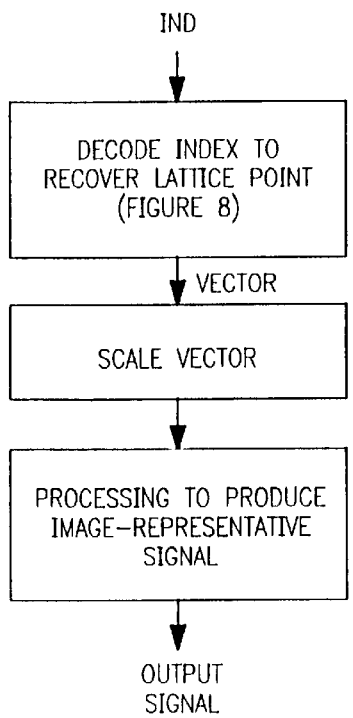
FIG. 3 is a flow diagram of a routine that can be utilized to program the decoder processor in accordance with an embodiment of the invention.

FIG. 3 is a flow diagram of a routine for programming the processor 160 of decoder 155 to implement decoding in accordance with an embodiment of the invention. Again, some or all functions may, if desired, be advantageously implemented in hardware for advantages in speed and/or efficiency. The block 330 represents the decoding of the index IND to recover the lattice point, which is representative of the original vector at the encoder end, and this routine, which includes features in accordance with an embodiment of the invention, is described in conjunction with the flow diagram of FIG. 8 and the subsidiary flow diagrams referenced therein. After vectors are recovered, they can be scaled (block 340) and processed (block 350) to produce image-representative signals and, ultimately, the recovered images in known fashion and as described, for example, in the above-referenced U.S. Pat. No. 5,436,985.

Figure 4:
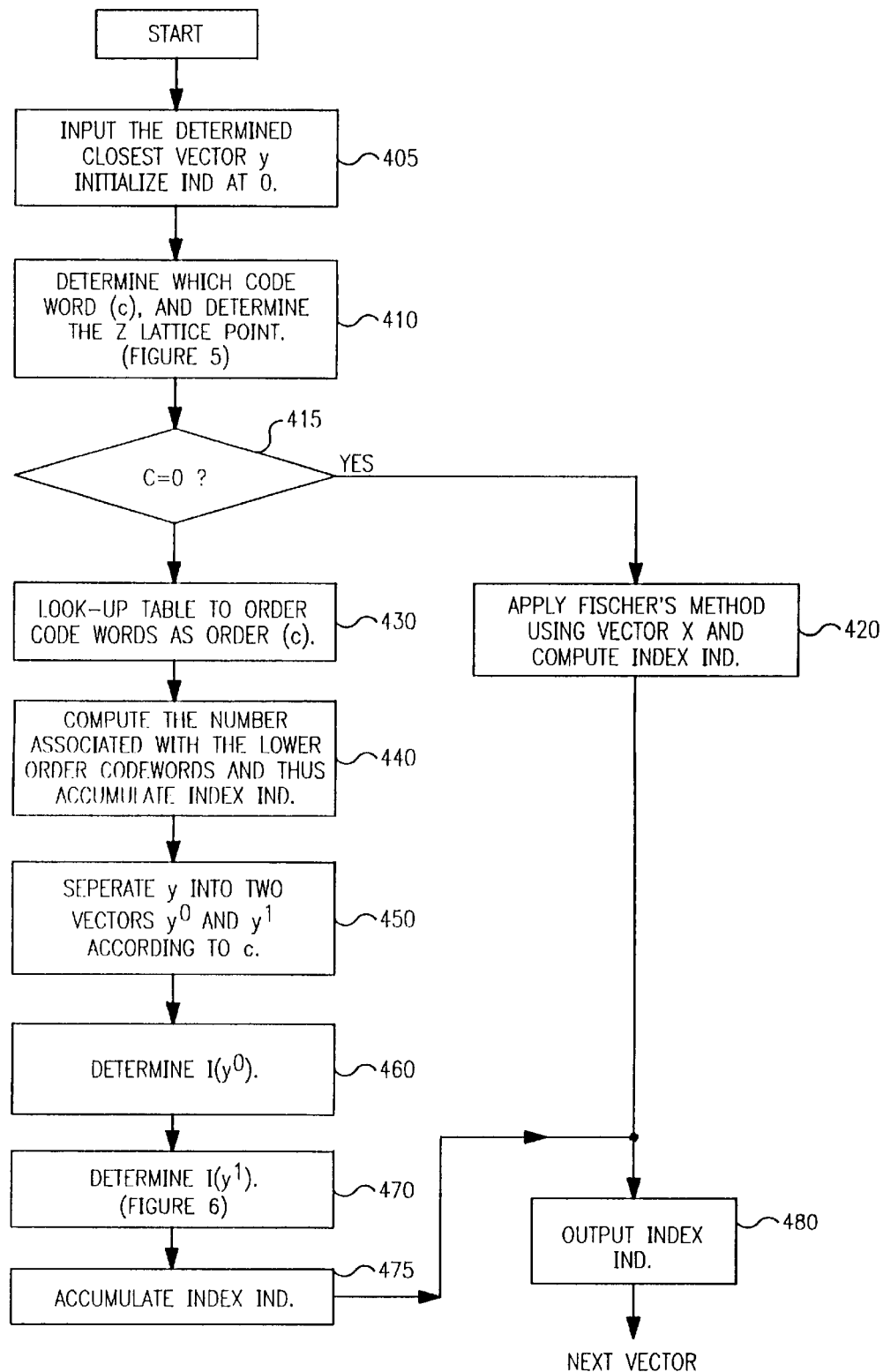
FIG. 4 is a flow diagram which together with the subsidiary flow diagrams of FIGS. 5–7, can be utilized to implement the routine for vector lattice point labelling in the encoder to obtain an index signal, in accordance with an embodiment of the invention.

Referring, now, to the flow diagram of FIG. 4, there is shown the routine for implementing the labelling of the lattice points for the selected vectors, as represented generally by the block 250 of FIG. 2. Throughout this disclosure, reference can also be made to the descriptions and equations set forth in Appendix I, for further detail. The block 405 represents the inputting of the determined closest vector, which is represented as y, and also represents the initializing of the index IND at zero. The block 410 represents the determination of the codeword that corresponds to the lattice point of the vector y, and also the lattice point in terms of the Z lattice, which is designated as vector x. The routine for implementing these determinations is set forth in conjunction with the flow diagram of FIG. 5, to which reference will now be made.

Figure 5:
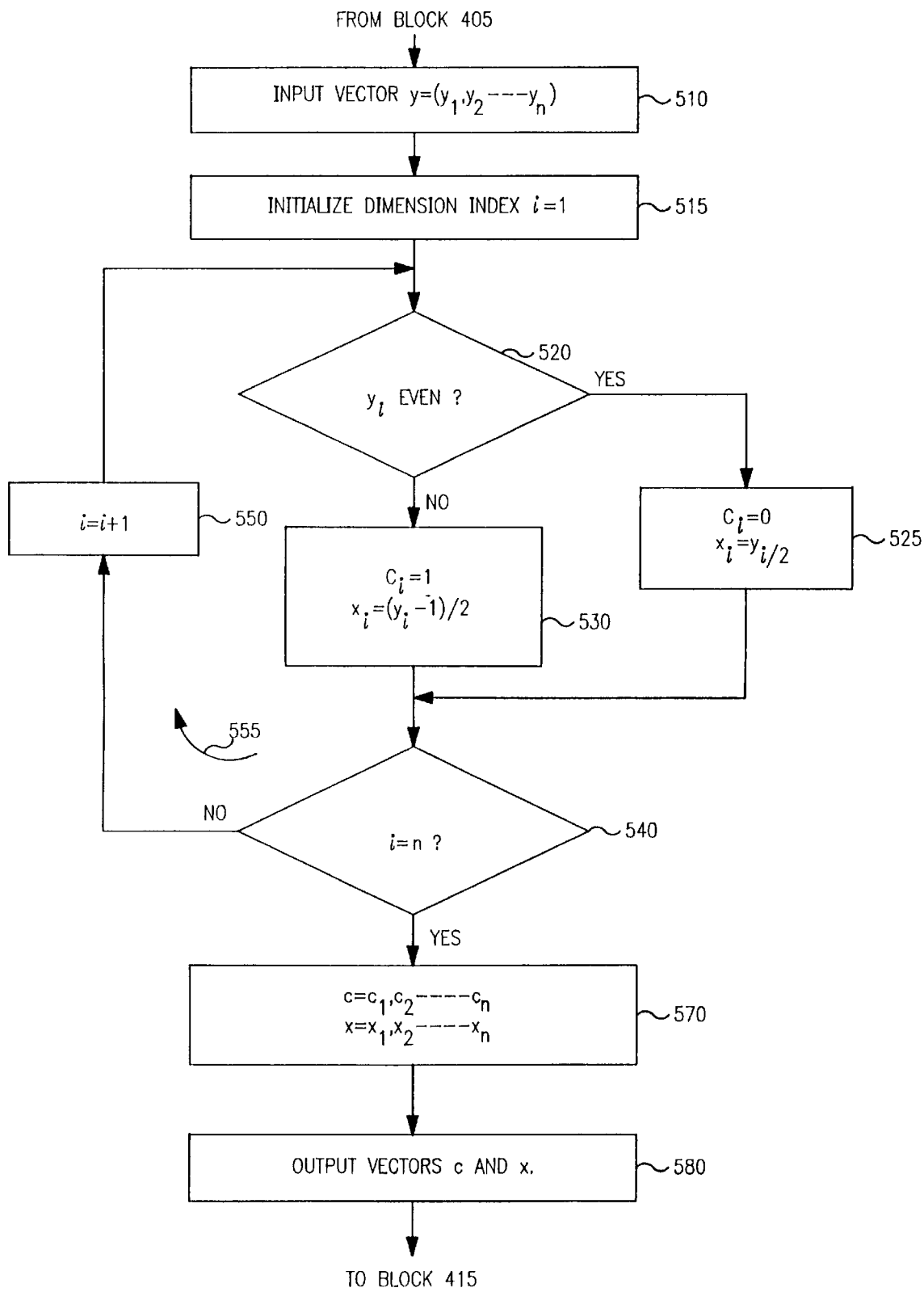

In FIG. 5, the block 510 represents the inputting of the vector y, and the block 515 represents the initializing of a dimension index to 1. Determination is then made (decision block 520) as to whether vector component $y_i$ (the first dimension for the first traversal through the loop) is even. If so, the block 525 is entered and, if not, the block 530 is entered. As seen from these blocks, if $y_i$ is even, the corresponding codeword bit must be 0 and, if not, it must be 1. In either case, the appropriate Z lattice vector component ($x_i$) is divided by 2 (to transform back to a Z lattice from the 2Z lattice point). Determination is then made (decision block 540) as to whether the last dimension (n) as been reached. If not, i is incremented (block 550), the block 520 is re-entered, and the loop 555 continues until all dimensions have been processed. The result is the output codeword vector c and the output Z lattice position vector x (block 570), which are output (block 580).

Referring again to FIG. 4, determination is next made (decision block 415) as to whether the determined codeword c, is 0. If so, the block 420 is entered, and the routine of Fischer's method (for a Z lattice) can be applied using the vector x, and the label computed thereby can be output as index IND. Fischer's method is described, for example, in T. R. Fischer, "A Pyramid Vector Quantizer", IEEE Transactions On Information Theory, Volume IT-32, July, 1986. If the inquiry of block 415 is answered in the negative, the block 430 is entered, this block representing the employment of a look-up table to order the codewords c as order(c). Next, the highest index number associated with the lower order code words (that is, lower than the determined code word c) is computed (block 440), with the result being accumulated to index IND. This can be implemented using the relationship set forth in Appendix I at a(1) at page 27 thereof.

Continuing with the description of the routine of FIG. 4, the block 450 represents the dividing of the vector y (taking account of c) into odd and even subvector components. These subcomponents are respectively designated $y^0$ and $y^1$. Next, the block 460 represents applying Fischer's method to the vector $y^0$ to obtain an index $I(y^0)$, since the even component has its basis in a Z lattice. Then, as represented by block 470, an index $I(y^1)$ is determined for the subvector component $y^1$. The routine for this determination is illustrated in conjunction with the flow diagram of FIG. 6.

Figure 6:
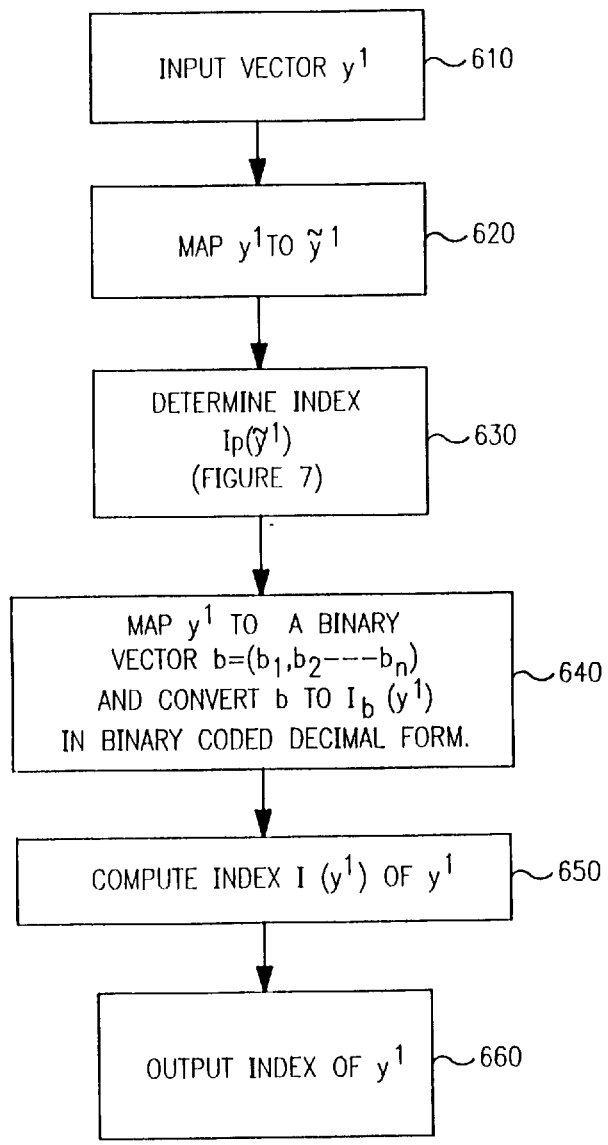

Referring now to the flow diagram of FIG. 6, the block 610 represents the inputting of the subvector component $y^1$. The subvector component $y^1$ is then mapped to a vector designated $\tilde{y}^1$, in accordance with the relationship set forth at page 20, equation 30 of Appendix I. It is seen that this involves folding the odd subvector component into a vector space having only positive components. The block 630 represents the determination of the index $I_p(\tilde{y}^1)$ for the subvector $\tilde{y}^1$. This determination can be performed using the routine described in conjunction with the flow diagram of FIG. 7 which will be treated momentarily. This subvector component $y^1$ is then mapped to a binary vector b, and b is converted to an index $I_B(y^1)$ in binary coded decimal form, using the relationships at step (a)(2) at page 22 of Appendix I (block 640). Next, as represented by the block 650, the index $I(y^1)$ of subvector component $y^1$ can be determined in accordance with the relationship at step (a)(3) at page 22 of Appendix I. The index of $y^1$ can then be output (block 660).

Figure 7:
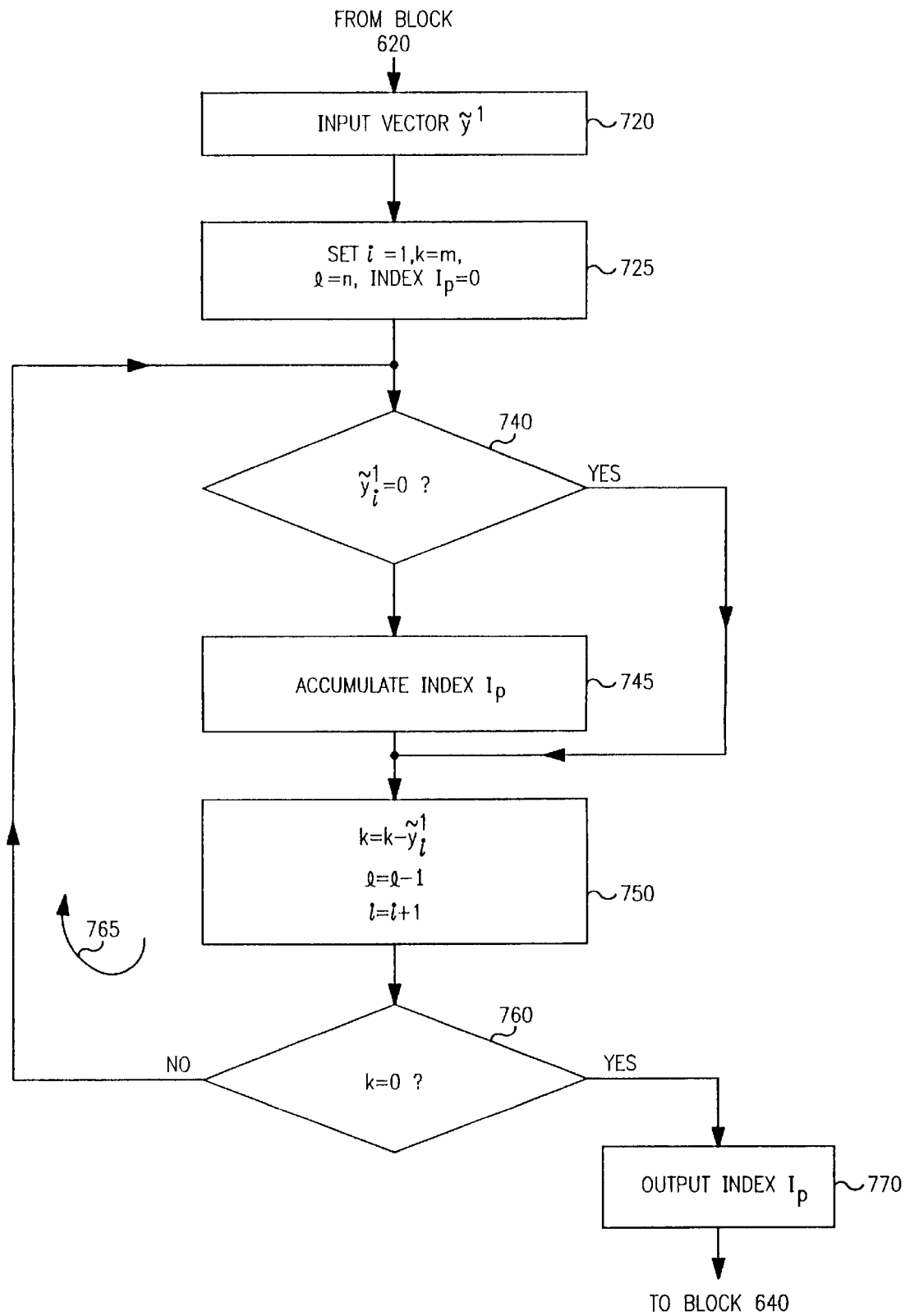

Reference can now be made to the routine represented by the flow diagram of FIG. 7 for the operation represented by the block 630 of FIG. 6. In FIG. 7, the vector $\tilde{y}^1$ is input (block 720) and then the index i (dimension) is initialized at 1, and the index k (norm) is initialized at m, and the index l (which keeps track of the dimension, starting at the highest dimension) is initialized at n, and an index $I_p$ (a labelling index) is initialized at 0. In the subsequent loop 765, the index $I_p$ is accumulated in accordance with the equation set forth in step (a)1 at page 17 of Appendix I (block 745). The index k is decremented to reflect the new norm (as each dimension is processed), and the index l is decremented as the index i is incremented (block 750). When the norm index k reaches 0 (decision blocks 760) the index $I_p$ can be output to the block 640, as represented by the block 770.

Referring again to FIG. 4, now that the indices for the subvector components $y^0$ and $y^1$ have been determined, the block 475 is entered, this block representing the accumulating of index IND in accordance with the relationships set forth at step (3) and step (4) at page 27 of Appendix I. The index IND can then be output (block 480), and the next vector can then be processed.

Figure 8:
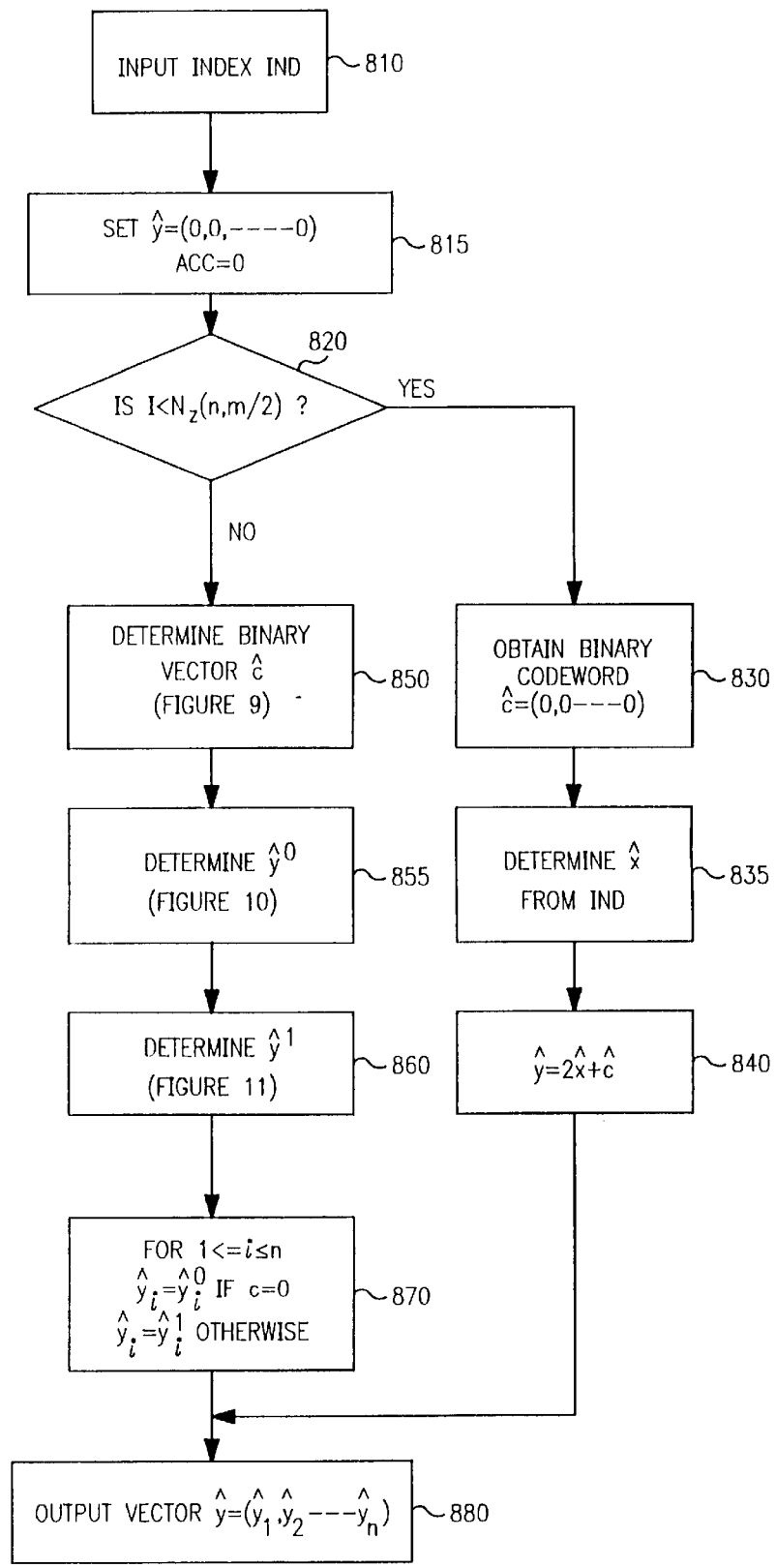
FIG. 8 is a flow diagram which, together with subsidiary flow diagrams of FIGS. 9–12, can be utilized to implement the routine for vector recovery in the decoder, in accordance with an embodiment of the invention.

Referring now to FIG. 8, there is shown a flow diagram of a routine for implementing the decoding of the index IND in accordance with and embodiment of the invention. The received index IND is input (block 810), and the vector to be reconstructed, designated $\hat{y}$ is initialized at 0 and an accumulator acc is also initialized at 0 (block 815). Determination is then made (decision block 820) as to whether index I is less than the number of indices that were allocated for the situation when the codeword is 0. If so, the determined binary codeword $\hat{c}$ is set to 0 (block 830). The reconstructed Z lattice vector, $\hat{x}$, is then determined from the index IND (block 835), using an inverse Fischer's method. The reconstructed vector $\hat{y}$ can then be determined as $2\hat{x}+\hat{c}$ (which is just $2\hat{x}$ for this case where $\hat{c}$ is 0). The block 850 represents the determination of the reconstructed binary vector $\hat{c}$ (for the case where $\hat{c}$ is not 0), this routine being described in further detail in the flow diagram of FIG. 9. Then, as represented by the block 855, the reconstructed subvector component $\hat{y}^0$ and the reconstructed subvector component $\hat{y}^1$ are successively determined (blocks 855 and 860), using the routines of the flow diagrams of FIGS. 10 and 11, respectively. [In the routine of FIG. 11, the inverse Fischer's method is modified to take account of the folding technique previously described, and the modified inverse Fischer's method is described in the flow diagram of FIG. 12.] The block 870 is then entered, this block representing the determination of each reconstructed dimension $\hat{y}_1$ from either the reconstructed even subvector component (if $\hat{c}$ is 0) or from the reconstructed odd subvector component otherwise. The reconstructed vector $\hat{y}$ can then be read out (block 880).

Figure 9:
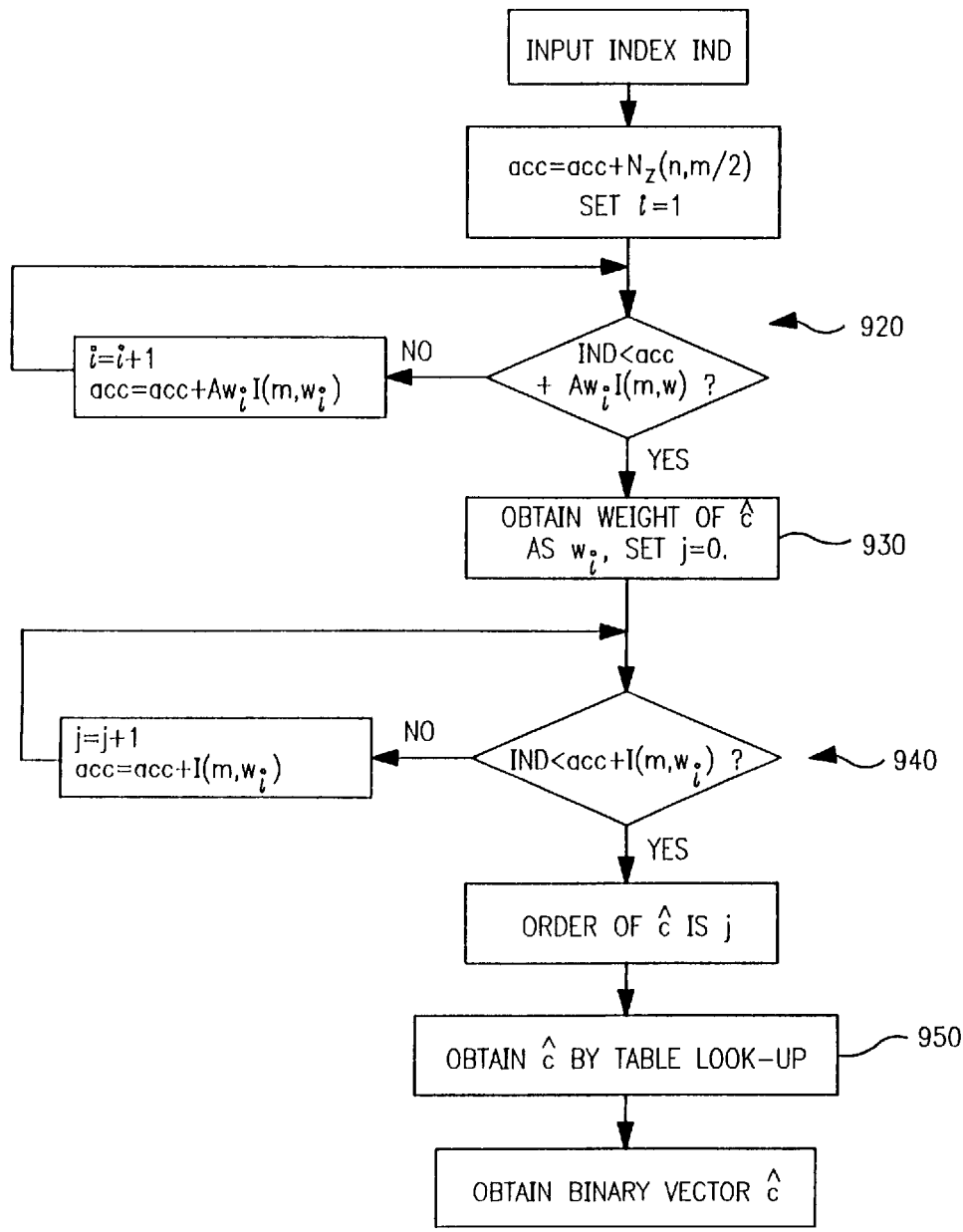

In the routine of FIG. 9, the loop 920 is used to determine the group allocation of the index and the Hamming weight (block 930). The order of the reconstructed codeword can then be determined (loop 940), and $\hat{c}$ can be obtained from a look-up table (block 950).

Figure 10:
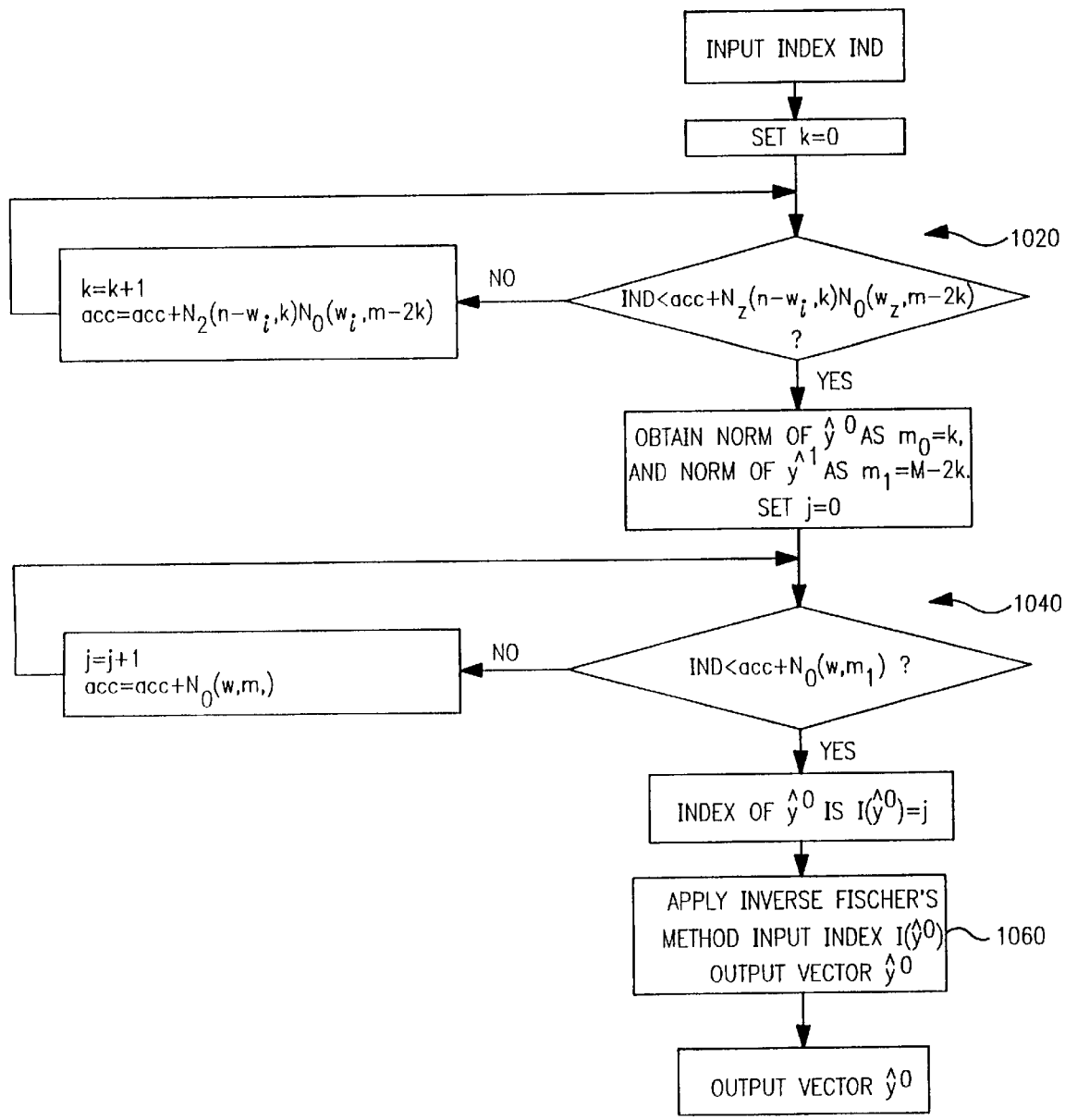

In the flow diagram of FIG. 10, the routine works backward from the index group sizes to get the norms. The variable m is the norm for the sum of the even and odd parts of the vector. The loop 1020 identifies the norms of $\hat{y}^0$ and $\hat{y}^1$. The loop 1040 identifies the reconstructed index of $\hat{y}^0$. The inverse Fischer's method can then be used to obtain the reconstructed even subvector component (block 1060).

Figure 11:
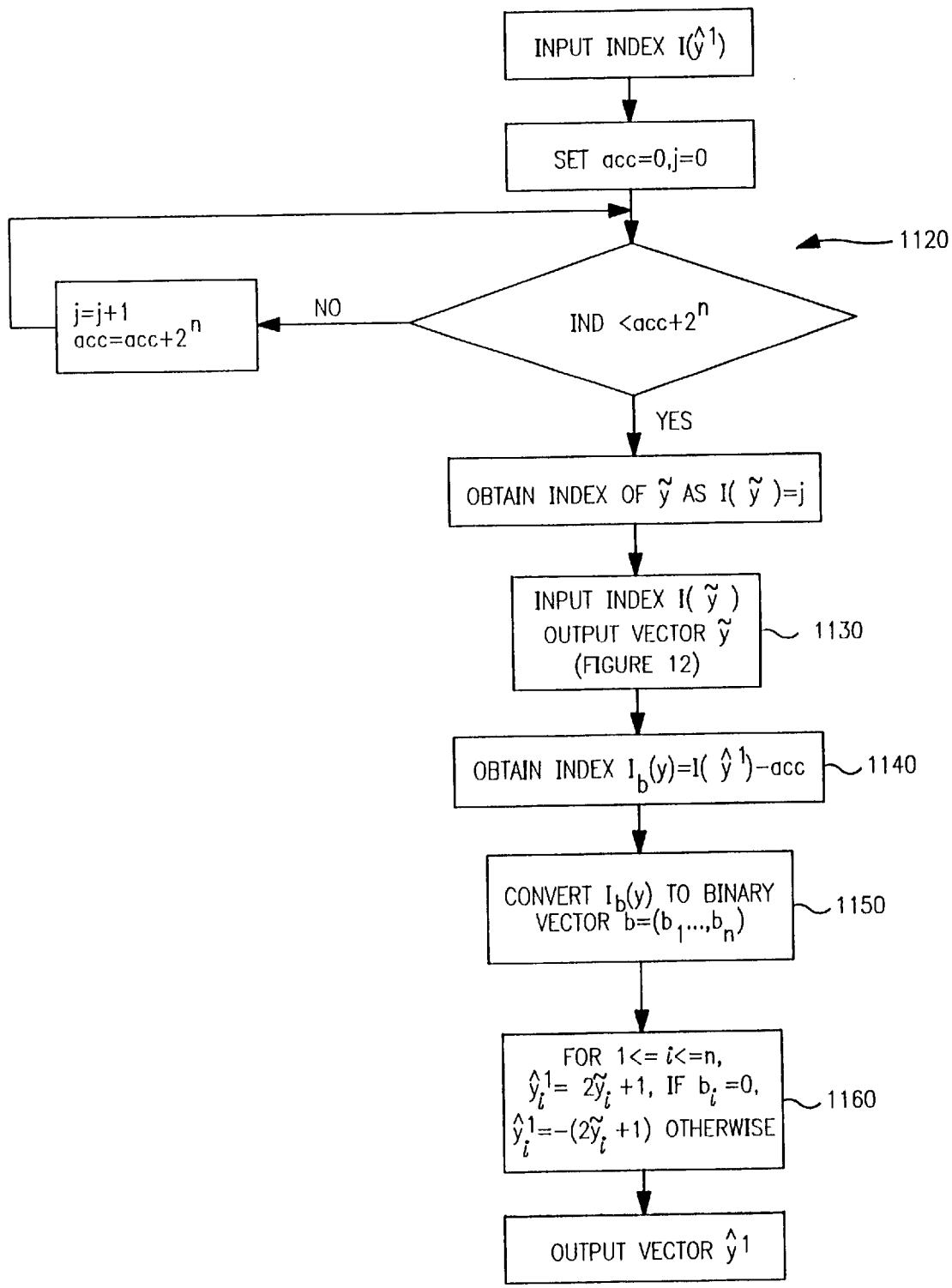

In FIG. 11, the loop 1120 performs the inverse of the previously described vector folding technique. To obtain the index of $\tilde{y}$ a modified inverse Fischer technique can then be used (FIG. 12) to obtain the vector $\tilde{y}$ from the index $I(\tilde{y})$ (block 1130). The index $I_B(y)$ is then obtained and converted to binary vector b (blocks 1140 and 1150), and then the reconstructed odd subvector component is determined in accordance with the relationships of block 1160.

Figure 12:
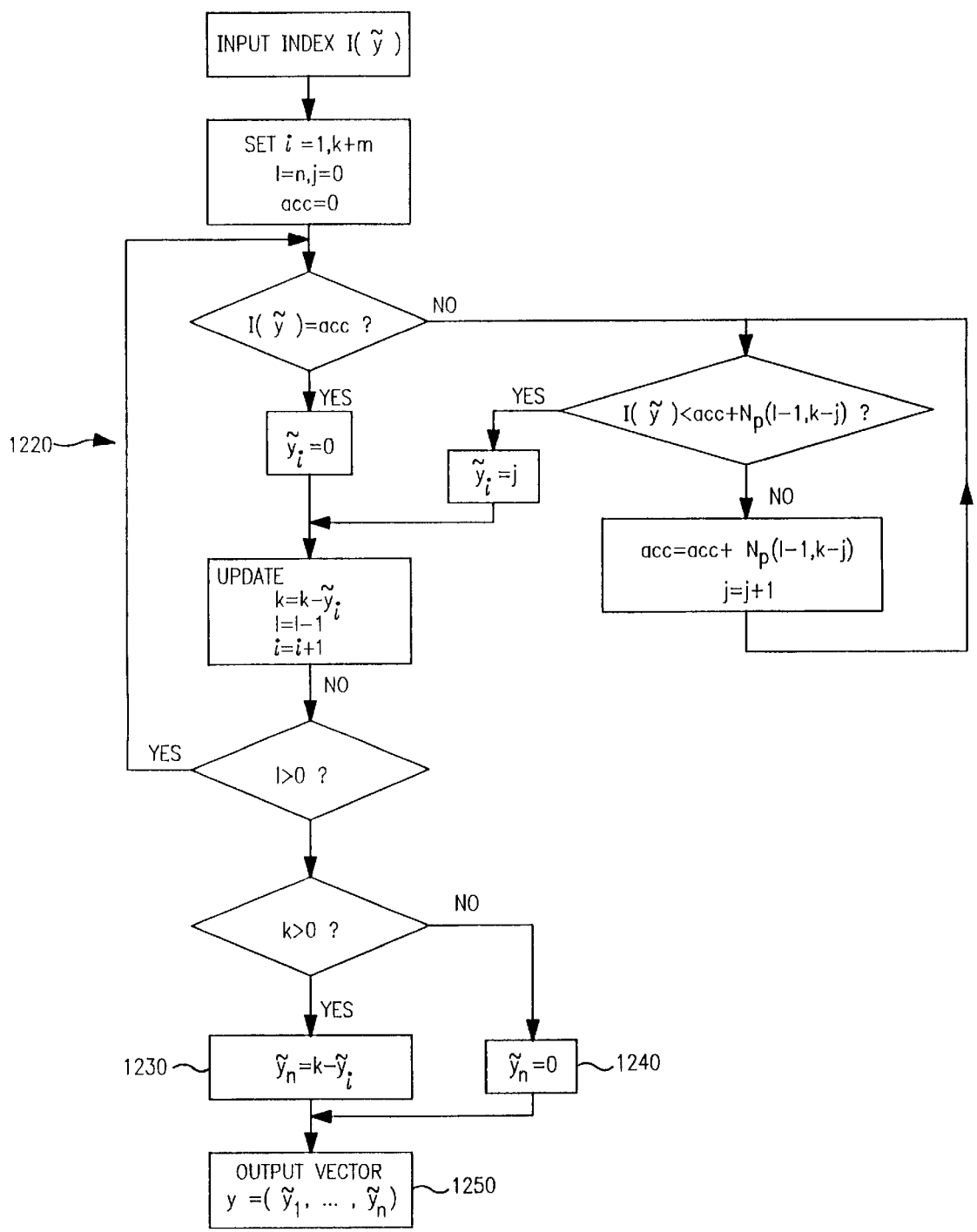

In the modified inverse Fischer technique of FIG. 12, the loop 1220 take account of the form of the folded vector, and the folded vector dimensional components $\tilde{y}_1$ are determined (blocks 1230 and 1240) and are output (block 1250).

The invention has been described in terms of a particular illustrative embodiment, but variations within the spirit and scope of the invention will occur to those skilled in the art. For example, it will be understood that similar technique and apparatus can be applied for Construction B lattices, as described at pages 31–40 of Appendix I. Also, while the illustrative example hereof was in terms of a pyramid type of boundary, the techniques hereof are applicable to other boundaries, such as a spherical boundary (see also page 41 of Appendix I).

Appendix I

Generalized Labeling Algorithms for Various Lattices with Pyramid and Sphere Boundaries C. C. Wang, H. Q. Cao, W. Li and K. K. Tzeng

Abstract

Generalized labeling algorithms for two major types of lattices: Construction A and Construction B lattices are presented. These algorithms are developed based on the relations between lattices and linear block codes and transformations among several specially defined lattices. It can be considered as a generalization of the approach given by Fischer. The 100% efficiency of labeling in these algorithms gives full utilization of indexing bits for binary representations. Many important lattices ($E_8$, $\Lambda_{16}$, ...) can be indexed to any dimension and norm. The low complexity (both in memory and in computation) of these algorithms make possible the development of practical lattice vector quantizers of large norm and large dimension by combining these algorithms with other fast encoding algorithms.

Index term – vector quantization, lattice vector quantization, lattice, Construction A, Construction B, linear block code, decoding, encoding, labeling.

This work was supported in part by the National Science Foundation under Grant NCR-9406043.
The authors are with the Department of Electrical Engineering and Computer Science, Lehigh University, Bethlehem, PA 18015-3084.

I. INTRODUCTION

Lattices have attracted much attention in vector quantization (VQ) for image and video coding. There are two essential issues for lattice application in VQ. One is the development of fast encoding and decoding algorithms, the other is the requirement of algorithms for labeling lattice points within certain boundaries. The most commonly considered boundaries in image and video coding are pyramid and sphere boundaries. In this paper, we focus on the development of algorithms for labeling lattice points on pyramid surfaces. Algorithms for labeling lattice points on sphere surfaces can be developed similarly and will be briefly discussed.

As we know, for low bit rate VQ in which only small number of lattice points are involved, labeling lattice points is relatively easy. The most straightforward way is to use a table to store all those lattice points and their corresponding indices. However, high bit rate VQ is very important to high quality image coding. For high bit rate VQ, the size of the table will increase dramatically and thus extra storage units may be required. Furthermore, this will also lose one of the major advantages of lattice VQ which primarily aims at eliminating the requirement of a table for storing a codebook so that high bit rate can be employed in VQ without storage burden. Several algorithms have been developed for labeling lattice points. Conway and Sloane [1] derived a labeling method in which every point of the lattice $L$ covered by a Voronoi cell of lattice $kL$ ($k$ is integer) is associated with an index vector. The restriction of this algorithm is that it is only applicable to Voronoi cells of the lattice. For other boundaries, such as sphere, pyramid, etc., the algorithm is not efficient, i.e. not all indices are used. Other algorithms, e.g. the algorithm developed in [2], are only applicable to special designs. However, the algorithm introduced by Fischer [3] is very efficient for labeling the $Z^n$ lattice on pyramid surface. Labeling algorithm for $D_n$ ($n \geq 2$) can be directly derived from this algorithm. But it can not be applied to other important lattices such as $E_8$ and $\Lambda_{16}$. Generalized algorithms for labeling various lattices, e.g. $E_8$ and $\Lambda_{16}$ and, in general, any Construction A and Construction B lattices, are developed based on the relations between lattices and linear block codes and transformations among several specially defined lattices. It can be considered as a generalization of the approach given by Fischer [3]. Hereafter, we will not distinguish the usage of labeling, indexing and encoding if the context makes it clear. Also, we may freely use the terms lattice points and lattice vectors.

The organization of this paper is as follows. In the next section, we first introduce the fundamentals of lattice, in particular, the connections between lattices and binary linear block codes. We then discuss the geometric structure of Laplacian and Gaussian sources and the scheme for counting lattice points on or inside two kinds of boundaries associated with these two sources. A brief review of Fischer's algorithm for labeling $Z^n$ lattice on pyramid surfaces is then given. In this regard, we point out its application for labeling $D_n$ lattice. In Section III, a generalized labeling algorithm for Construction A lattice is presented with the labeling of the $E_8$ lattice described. In Section IV, a generalized labeling algorithm for Construction B lattice, in particular the $\Lambda_{16}$ lattice is introduced. We then discuss similar generalizations of Fischer's algorithm for labeling lattice points on sphere surfaces in Section V. Finally we give a conclusion in Section VI.

II. PRELIMINARIES

A. Basics of Lattice

The concept of *lattice* originated from sphere packing problem. One way to obtain sphere packing is *lattice packing* whose centers form a *lattice*. Basically, lattice is a set of regularly distributed points in Euclidean space. Density is one of the main parameters to measure the goodness of a lattice. It is defined as the portion of a space covered by identical spheres. The best known lattices for quantization also have been recognized as the densest lattices in their corresponding dimensions. These lattices include $D_n (n \geq 2)$, $E_n (n = 6, 7, 8)$, as well as the 16-dimensional Barnes-Wall lattice $\Lambda_{16}$. All these lattices can be used for efficient quantizers for uniformly distributed inputs.

It is known that the process of VQ encoding includes the decoding of lattices. Given any point in an $n$-dimensional Euclidean space, finding the closest point in an $n$-dimensional lattice is called lattice decoding. Lattice decoding and lattice labeling together form the encoding process of lattice VQ. Therefore, the development of efficient decoding algorithms for lattices will directly result in fast encoding of VQ.

Decoding $Z^n$, $D_n$, $E_8$ lattices is relatively simple [4]. Decoding other lattices, such as Barnes-Wall lattice $\Lambda_{16}$ requires more work. Various algorithms for decoding $\Lambda_{16}$ have been developed which usually trade slight performance loss for complexity reduction. In this paper, we are not going to discuss the decoding of lattices. Our major focus is on labeling lattice for pyramid and sphere surfaces.

In the following, the fundamentals of lattice are briefly reviewed.

A.1 Definition of Lattice

An $n$-dimensional lattice is a set of vectors (lattice points) in $n$-dimensional space which form an additive group; i.e., if $a$ and $b$ are two lattice points, the $a+b$ and $a-b$ are also lattice points, thus 0 is always a lattice point, called the origin of the lattice. Geometrically, lattice is a set of points in an $n$-dimensional Euclidean space whose distribution is regular. Thus, lattice $L_n$ is defined as a set of vectors which can be generated from the linear combination of $n$ basis vectors, i.e., $$L_n = \{x \in R^n | x = u_1 a_1 + \cdots + u_n a_n\} \tag{1}$$

where $a_1, \cdots, a_n$ are $n$ linearly independent vectors in real Euclidean space $R^m$ with $m \geq n$ (usually $m = n$), and $u_1, \cdots, u_n$ are integers. The vectors $a_1, \cdots, a_n$ are called a basis for the lattice. For any vector $c \in R^n$, a coset of $L_n + c$ of $L_n$ is $$L_n + c = \{y \in R^n | \forall x \in L_n, y = x + c\} \tag{2}$$

For instance, the simplest lattice is $Z$, which is the set of integers. The $n$-fold Cartesian product of $Z$, namely, $Z \times Z \times \cdots \times Z$ results in the $n$-dimensional integer lattice $Z^n$, also known as the cubic lattice. It is formed by all the $n$-dimensional vectors with integer coordinates.

A.2 Relations between Linear Block Codes and Lattices

Lattices and codes have a very close relationship. As shown in the following, many lattices can be constructed from binary linear block codes.

Basically, a binary linear block code is defined as a set of $n$-tuples, i.e., $C = \{a = (a_0, a_1, \cdots, a_{n-1}) | a_i \in F_2 \text{ for } i = 0, 1, ..., n-1\}$. Here, $F_2 = \{0, 1\}$ denotes the finite field of two elements. The Hamming weight (or weight) of a codeword is defined as the number of nonzero components of the codeword. A notation of $C = (n,k)$ or $C = (n,k,d)$ are often used to represent the main parameters for a linear block code: the length of the code $n$, the dimension of the code $k$, and the minimum distance of the code $d$. For a linear code, minimum distance of the code is the same as the minimum weight among all nonzero codewords.

Construction A and Construction B [4] are the two simplest ways to construct a lattice from a binary linear block code.

*Definition 1:* (Construction A) An $n$-dimensional lattice $L_n$ is a Construction A lattice if any vector $x \in L_n$ is congruent (modular 2) to a codeword $c \in C$, (namely, $x_i \equiv c_i \bmod 2$ for $i = 1, ..., n$), where $C$ is a binary linear block code. Thus, $$L_n = \{x \in Z^n | \exists c \in C, x \equiv c \bmod 2\} \qquad (3)$$

Usually, a formula is used to represent these lattices:

$$L_n = C + 2Z^n \qquad (4)$$

where, $2Z^n$ is a set of $n$-tuples with all the coordinates being even integers.

A simple lattice in this category is the $D_n$ lattice (checkboard lattice) for $n \geq 2$ where $C$ is the $(n, n-1, 2)$ even parity check code, namely, $$D_n = (n, n-1, 2) + 2Z^n. \qquad (5)$$

*Definition 2:* (Construction B) An $n$-dimensional lattice $L_n$ is a Construction B lattice if any vector $x \in L_n$ is congruent (modular 2) to a codeword $c \in C$, where $C$ is a doubly even linear block code, and the sum of all the coordinates of $x$ is a multiple of 4. Thus, $$L_n = \{x = (x_1, x_2, \cdots, x_n) \in Z^n | \exists c \in C, x \equiv c \ (mod \ 2) \ and \ \sum_{i=1}^{n} x_i \equiv 0 \ mod \ 4\} \qquad (6)$$

Here, doubly even code implies that the weight of all codewords is a multiple of 4.

A formula for representing Construction B lattice is $$L_n = C + 2(n, n-1, 2) + 4Z^n. \qquad (7)$$

Obviously, Construction B lattices can also be formulated as:

$$L_n = C + 2D_n \tag{8}$$

where in (7) and (8), $C$ is a doubly even linear block code.

Based on the above discussion on construction of lattices, two important lattices for the purpose of this paper are introduced in the following.

1. Gossert lattice $E_8$

This lattice is named after Gossert who was the first person to study this lattice. It is one of the most important lattices. There are several different ways to define $E_8$, but they all result in equivalent lattices. Here, two lattices are equivalent if one can be derived from the other by scaling, reflection and rotation.

One definition of $E_8$ is through Construction A given by $$E_8 = (8,4,4) + 2Z^8 \tag{9}$$

where $(8,4,4)$ is an extended Hamming code (a first order Reed–Muller code $RM(1,3)$) (see [5]). Since $(8,4,4)$ has $2^4 = 16$ codewords, $E_8$ can also be interpreted as a union of 16 cosets of $2Z^8$, i.e., $$E_8 = \bigcup_{i=0}^{15}(2Z^8 + c_i) \tag{10}$$

where, $c_i, i = 0, 1, ..., 15$ represents the 16 codewords of $(8,4,4)$ code.

2. Barnes–Wall lattice $\Lambda_{16}$

This lattice is also constructed from an extended Hamming code, the $(16,5,8)$ code (a Reed–Muller code $RM(1,4)$), through Construction B, i.e., $$\Lambda_{16} = (16,5,8) + 2D_{16} \tag{11}$$

Using coset representation, $\Lambda_{16}$ is a union of 32 cosets of $2D_{16}$, such as, $$\Lambda_{16} = \bigcup_{i=0}^{31}(2D_{16} + c_i) \tag{12}$$

where, $c_i, i = 0, 1, ..., 31$ represents the 32 codewords of $(16,5,8)$ code.

The formulas for several best known lattices of dimension $\leq 32$ is given in Table I.

TABLE I

DENSEST LATTICES AND THEIR SUB-LATTICES OF DIMENSION 24 AND $2^n, 2 \leq n \leq 5$

| Lattices | Formulas | Construction |
|---|---|---|
| $D_4$ | $(4,3,2) + 2Z^4$ | A |
| $E_8$ | $(8,4,4) + 2Z^8$ | A |
| $D_{16}$ | $(16,15,2) + 2Z^{16}$ | A |
| $\Lambda_{16}$ | $(16,5,8) + 2(16,15,2) + 4Z^{16}$ | B |
| $D_{24}$ | $(24,23,2) + 2Z^{24}$ | A |
| $H_{24}$ | $(24,12,8) + 2(24,23,2) + 4Z^{24}$ | B |
| $\Lambda_{24}$ | $H_{24} \cup (H_{24} + (-3/2, 1/2, ..., 1/2))$ | coset |
| $D_{32}$ | $(32,31,2) + 2Z^{32}$ | A |
| $H_{32}$ | $(32,16,8) + 2(32,31,2) + 4Z^{32}$ | B |
| $\Lambda_{32}$ | $H_{32} \cup (H_{32} + b)$ | coset |

B. *Sources and Boundaries*

From the definition of a lattice, the number of lattice points in an Euclidean space is infinite. However, finite bit rate should be considered when a quantizer is designed for image coding, which means the size of a codebook or the number of codewords in a codebook should be finite. For a vector quantizer of bit rate $R$, the number of codewords should be $2^R$. Therefore, we need to define a boundary for truncating the lattice in such a way that there will be at least $2^R$ lattice points within the boundary. The defining of a boundary is usually source dependent.

Memoryless Laplacian and Gaussian sources are two models for image sources which have been extensively studied. Truncating lattices to match Laplacian or Gaussian distribution is one consideration for applying lattice VQ to these sources.

Let $x = \{x_i\}$ be a sequence of independent and identically distributed (i.i.d.) Laplacian random variables with probability density function (PDF)

$$p_X(x_i) = \frac{\lambda}{2} e^{-\lambda|x_i|}$$

Then PDF of a memoryless $K$-dimensional Laplacian vector $\boldsymbol{x}$ is $$\begin{aligned} f_X(\boldsymbol{x}) &= \prod_{i=1}^{K} p_X(x_i) \\ &= \prod_{i=1}^{K} \frac{\lambda}{2} e^{-\lambda|x_i|} \\ &= (\frac{\lambda}{2})^K e^{-\lambda \sum_{i=1}^{K} |x_i|}. \end{aligned}$$

The contour of constant distribution of this source is specified as $$\sum_{i=1}^{K} |x_i| = \| \boldsymbol{x} \|_1 = constant \tag{13}$$

where, $\| \boldsymbol{x} \|_1$ represents the $l_1$ norm of $\boldsymbol{x}$. Geometrically, (13) indicates a surface of pyramid in an Euclidean space. So, the truncation of a lattice using a pyramid as a boundary is suitable for memoryless Laplacian source, namely, for designing a lattice quantizer of bit rate $R$, we need to truncate a lattice using a pyramid such that there are $\geq 2^R$ lattice points inside this pyramid. Based on this geometric structure, Fischer introduced a pyramid vector quantizer (PVQ) in [3].

If $\boldsymbol{x} = \{x_i\}$ is a sequence of i.i.d. Gaussian random variables with probability density function $$\begin{aligned} p_X(x_i) &= \frac{1}{\sqrt{2\pi}} e^{x_i^2/2} \\ &= (\frac{1}{\sqrt{2\pi}})^K e^{1/2 \sum_{i=1}^{K} x_i^2} \end{aligned}$$

where, without loss of generality, the mean and the variance have been assumed to be 0 and 1, respectively. Then the PDF of a memoryless $K$-dimensional Gaussian vector $\boldsymbol{x}$ is $$f_X(\boldsymbol{x}) = \prod_{i=1}^{K} p_X(x_i) \tag{14}$$

The contour of constant probability distribution is $$\sum_{i=1}^{K} x_i^2 = \| \boldsymbol{x} \|_2 = constant \tag{15}$$

where $\| x \|_2$ is usually referred to as the $l_2$ norm of $x$. Hereafter, we may only use $\| \cdot \|$ to indicate a norm without distinguishing $l_1$ or $l_2$ norms as long as the context makes it clear.

It is clear that, in geometric point of view, (15) indicates the surface of a sphere in an Euclidean space. So the truncation of a lattice using a sphere boundary is appropriate for memoryless Gaussian source.

Since a boundary is used for truncating a lattice to obtain the desired bit rate of VQ, one needs to count the number of lattice points on all surfaces up to this boundary. In lattice research, the theta function $\Theta_\Lambda = \sum_{x \in \Lambda} q^{x \cdot x}$ has been used for counting the number of lattices points on spheres of different $l_2$ norms [4]. And based on relations between codes and lattices, formulas have also been derived for counting the number of lattice points on a pyramid [6].

C. Labeling $Z^n$ and $D_n$ Lattices

The cubic lattice $Z^n$ is a very useful lattice although it's simple. A pyramid vector quantizer (PVQ) [3] was developed based on $Z^n$ and a labeling algorithm for $Z^n$ on pyramid was also introduced. Here, we give a brief review of this labeling algorithm.

Let $S_Z(n, m)$ denote the set of lattice points on a pyramid of norm $m$ in an $n$-dimensional space (to be referred to as pyramid codewords later), i.e., $$S_Z(n, m) = \{x \in Z^n | \sum_{i=1}^{n} |x_i| = m\} \tag{16}$$

Let $N_Z(n, m)$ be the size of $S_Z(n, m)$. For the cubic lattice, a recursive formula for calculating $N_Z(n, m)$ has been given in [3] as $$N_Z(n, m) = N_Z(n-1, m) + N_Z(n-1, m-1) + N_Z(n, m-1). \tag{17}$$

with initialization $$N_Z(n, 0) = 1 \; for \; all \; n \geq 0 \tag{18}$$

$$N_Z(0, m) = 0 \; for \; all \; m \geq 1 \tag{19}$$

The basic idea of labeling lattice points of $S_Z(n, m)$ is to define an order among all the codewords of $S_Z(n, m)$ and, based on this ordering, to derive an enumeration method in assigning each lattice point a unique integer (index) in $\{0, 1, ..., N_Z(n,m) - 1\}$, which can be represented in binary format of $log_2(N_Z(n,m))$ bits.

An order among lattice points on $S_Z(n,m)$ is defined as follows.

*Definition 3: index($x$) < index($y$)* if either

1. $x_i = y_i$ for $1 \leq i < k \leq n$ and $|x_k| < |y_k|$.

or

2. $x_i = y_i$ for $1 \leq i < k \leq n$ and $|x_k| = |y_k| = \delta$ with $x_k = \delta$, $y_k = -\delta$.

As a consequence, partitions can be derived according to the values of the coordinates of a lattice point $x = (x_1, x_2, ..., x_n)$. Table II shows how the range of index is partitioned based on the values of $x_1$. Table III shows further partition based on $x_2$, where $K_k$ is defined as $K_k = N_Z(n-1,m) + 2\sum_{j=1}^{k-1} N_Z(n-1, m-j)$ for $k \geq 2$, and $K_0 = 0$, $K_1 = N_Z(n-1,m)$. This partition then continues until the last coordinate $x_n$ is reached. Then every lattice point of $S_Z(n,m)$ can be indexed.

In doing so, a one-to-one mapping is then established between the pyramid codewords of $S_Z(n,m)$ and the integer set $\{0, 1, ..., N_Z(n,m) - 1\}$. For any specific pyramid codeword, the index can be determined and be represented by an index or an index vector of $log_2(N_Z(n,m))$ bits. In decoding, the components of the codeword are extracted sequentially beginning with $x_1$. The labeling and decoding procedures are given in the following algorithm.

TABLE II

PARTITION OF INDEX RANGE ACCORDING TO FIRST COORDINATE $x_1$ OF $x$

| $x_1$ | index range |
|---|---|
| 0 | 0 <br> $\downarrow$ <br> $N_Z(n-1, m) - 1$ |
| +1 | $N_Z(n-1, m)$ <br> $\downarrow$ <br> $N_Z(n-1, m) + N_Z(n-1, m-1) - 1$ |
| −1 | $N_Z(n-1, m) + N_Z(n-1, m-1)$ <br> $\downarrow$ <br> $N_Z(n-1, m) + 2N_Z(n-1, m-1) - 1$ |
| +2 | $N_Z(n-1, m) + 2N_Z(n-1, m-1)$ <br> $\downarrow$ <br> $N_Z(n-1, m) + 2N_Z(n-1, m-1) + N_Z(n-1, m-2) - 1$ |
| −2 | $N_Z(n-1, m) + 2N_Z(n-1, m-1) + N_Z(n-1, m-2)$ <br> $\downarrow$ <br> $N_Z(n-1, m) + 2N_Z(n-1, m-1) + 2N_Z(n-1, m-2) - 1$ |
| $\vdots$ | $\vdots$ |
| $+m$ | $N_Z(n-1, m) + 2\sum_{j=1}^{m-1} N_Z(n-1, m-j)$ |
| $-m$ | $N_Z(n-1, m) + 2\sum_{j=1}^{m-1} N_Z(n-1, m-j) + 1$ |

Algorithm (1) (for labeling $Z^n$)

Assume all $N_Z(l, k)$ for $0 \leq l \leq n$, $0 \leq k \leq m$ are pre-calculated or stored.

*a) Labeling Procedure*

TABLE III

FURTHER PARTITION OF INDEX RANGE FOR $x_1 = k (k \geq 0)$ ACCORDING TO $x_2$

| $x_1$ | index range for $x_1 = k$ ($k \geq 0$) | $x_2$ | sub index range |
|---|---|---|---|
| +k | $K_k$ <br> ↓ <br> $K_k - 1$ <br> $+ N_Z(n-1, m-k)$ | 0 | $K_k$ <br> ↓ <br> $K_k + N_Z(n-2, m) - 1$ |
| | | +1 | $K_k + N_Z(n-2, m)$ <br> ↓ <br> $K_k + N_Z(n-2, m)$ <br> $+ N_Z(n-2, m-1) - 1$ |
| | | −1 | $K_k + N_Z(n-2, m)$ <br> $+ N_Z(n-2, m-1)$ <br> ↓ <br> $K_k + N_Z(n-2, m)$ <br> $+ 2N_Z(n-2, m-1) - 1$ |
| | | +2 | $K_k + N_Z(n-2, m)$ <br> $+ 2N_Z(n-2, m-1)$ <br> ↓ <br> $K_k + N_Z(n-2, m)$ <br> $+ 2N_Z(n-2, m-1) + N_Z(n-2, m-2) - 1$ |
| | | −2 | $K_k + N_Z(n-2, m)$ <br> $+ 2N_Z(n-2, m-1) + N_Z(n-2, m-2)$ <br> ↓ <br> $K_k + N_Z(n-2, m)$ <br> $+ 2N_Z(n-2, m-1) + 2N_Z(n-2, m-2) - 1$ |
| | | ⋮ | ⋮ |
| | | +m | $K_k + N_Z(n-2, m)$ <br> $+ 2\sum_{j=1}^{m-1} N_Z(n-2, m-j)$ <br> ↓ <br> $K_k + N_Z(n-2, m)$ <br> $+ 2\sum_{j=1}^{m-1} N_Z(n-2, m-j)$ |
| | | −m | $K_k + N_Z(n-2, m)$ <br> $+ 2\sum_{j=1}^{m-1} N_Z(n-2, m-j)$ <br> ↓ <br> $K_k + N_Z(n-2, m)$ <br> $+ 2\sum_{j=1}^{m-1} N_Z(n-2, m-j) + 1$ |

(0). Input $x \in S_Z(n,m)$. Set $index = 0$, $i = 1$, $k = m$, $l = n$. Define $$sgn(x) = \begin{cases} 1, & \text{if } x > 0 \\ 0, & \text{if } x = 0 \\ -1, & \text{if } x < 0 \end{cases}$$

(1).

if $x_i = 0$,     then $index = index + 0$, if $|x_i| = 1$,     then $index = index + N_Z(l-1,k) + [\frac{1-sgn(x_i)}{2}]N_Z(l-1,k-1)$, if $|x_i| > 1$,     then $index = index + N_Z(l-1,k) + 2\sum_{j=1}^{|x_i|-1} N_Z(l-1,k-j)$, $+[\frac{1-sgn(x_i)}{2}]N_Z(l-1,k-|x_i|)$, (2). Update $k \leftarrow k - |x_i|$, $l \leftarrow l - 1$ and $i \leftarrow i + 1$.

(3). If $k = 0$, then output $index$ and stop; otherwise, go to (1).

b) *Decoding Procedure*

(0). Input $index$. Set $\hat{x} = 0$, $i = 1$, $acc = 0$, $k = m$, $l = n$.

(1). If $index = acc$, then $\hat{x}_i = 0$, go to (4).

(2). If $index < acc + N_Z(l-1,k)$, then $\hat{x}_i = 0$, go to (4).

otherwise, $acc = acc + N_Z(l-1,k)$; set $j = 1$.

(3). If $index < acc + 2N_Z(l-1,k-j)$, then if $acc \leq index < acc + N_Z(l-1,k-j)$,    $\hat{x}_i = j$;

if $index \geq acc + N_Z(l-1,k-j)$,            $\hat{x}_i = -j$, and, $acc = acc + N_Z(l-1,k-j)$.

Otherwise, $acc = acc + 2N_Z(l-1,k-j)$; $j = j+1$, go back to (3).

(4). Update $k \leftarrow k - |\hat{x}_i|$, $l \leftarrow l - 1$ and $i \leftarrow i + 1$.

If $l > 0$, go to (1); otherwise, go to (5).

(5). If $k > 0$, then $\hat{x}_n = k - |\hat{x}_i|$.

(6). Output $\hat{x} = (\hat{x}_1, \hat{x}_2, ..., \hat{x}_n)$, and stop.

Example 1a: Given $x = (0, -2, 1, -1) \in S_Z(4,4)$, find the index of $x$. By computation, $N_Z(2,4) = 24$, $N_Z(2,3) = 16$, $N_Z(2,2) = 8$, $N_Z(1,2) = 2$, $N_Z(1,1) = 2$, $N_Z(0,1) = 0$ and $N_Z(0,0)=1$.

(0). Set $index = 0$; $i = 1$; $k = 4$ and $l = 4$.

(1). since $x_1 = 0$, $index = 0$.

(2). $i = 2, k = 4, l = 3$.

Go back to (1).

(1). $x_2 = -2$, so $index = 0 + N_Z(2,4) + 2N_Z(2,3) + [(1 - sgn(-2))/2]N_Z(2,2) = 48$.

(2). $i = 3, k = 2, l = 2$.

Go back to (1).

(1). $x_3 = 1$, so $index = 48 + N_Z(1,2) + [(1 - sgn(1))/2]N_Z(1,1) = 50$.

(2). $i = 4, k = 1, l = 1$.

Go back to (1).

(1). $x_4 = -1$, so $index = 50 + N_Z(0,1) + [(1 - sgn(-1))/2]N_Z(0,0) = 51$.

(2). Output $index = 51$, and stop.

Example 1b: Given $index = 51$, find a pyramid codeword of $S_Z(4,4)$.

(0). Set $\hat{x} = 0$, $i = 1$, $acc = 0$, $k = 4$, $l = 4$.

(1). Since $index \neq acc$, go to (2).

(2). Since $index < acc + N_Z(3,4) = 66$, then $\hat{x}_1 = 0$, go to (4).

(4). Update $k \leftarrow 4$, $l \leftarrow 3$ and $i \leftarrow 2$.

Go to (1).

(1). Since $index \neq acc$, go to (2).

(2). Since $index > acc + N_Z(2,4) = 16$, $acc = 16$, set $j = 1$.

(3). Since $index > acc + 2N_Z(2,3) = 40$, $acc = 40$, $j = 2$. go back (3).

(3). Since $index < acc + 2N_Z(2,2) = 56$ and $index > acc + N_Z(2,2) = 48$, then $\hat{x}_2 = -2$ and $acc = acc + N_Z(2,2) = 48$.

(4). Update $k \leftarrow 2$, $l \leftarrow 2$ and $i \leftarrow 3$.

Go to (1).

(1). Since $index \neq acc$, go to (2).

(2). Since $index > acc + N_Z(1,2) = 50$, then $acc = 50$. Set $j = 1$.

(3). Since $index < acc + 2N_Z(1,1) = 54$ and $index < acc + N_Z(1,1) = 52$, then $\hat{x}_3 = 1$.

(4). Update $k \leftarrow 1$, $l \leftarrow 1$ and $i \leftarrow 4$.

Go to (1).

(1). Since $index \neq acc$, go to (2).

(2). Since $index > acc + N_Z(0,1) = 50$, then $acc = 50$. Set $j = 1$.

(3). Since $index < acc + 2N_Z(0,0) = 52$ and $index = acc + N_Z(0,0) = 51$, then $\hat{x}_4 = -1$ and $acc = 51$.

(4). Update $k \leftarrow 0$, $l \leftarrow 0$ and $i \leftarrow 5$.

(5). Output $\hat{x} = (0, -2, 1, -1)$, and stop.

It should be noticed that Algorithm (1) derived for labeling pyramid codewords of $Z^n$ is also applicable for labeling $D_n$ lattices. As was defined in the previous section, $D_n$ is an $n$-dimensional lattice whose coordinates are integers and the sum of all its coordinates is even. The difference between $Z^n$ and $D_n$ is that $D_n$ has no pyramid with odd norms. But when a pyramid with an even norm, namely $S_Z(n, 2m)$, is considered, the total number of lattice points on the pyramid of $D_n$ is the same as $N_Z(n, 2m)$. Therefore, labeling $D_n$ lattices on a pyramid (of even norm) is the same as labeling $Z^n$ lattices on the pyramid of the same norm.

However, for some dimensions, $Z^n$ and $D_n$ may not give the best performance for a lattice vector quantizer (LVQ). Therefore, we need to consider the labeling of additional lattices. In the next two sections, we consider the labeling of the Construction A and Construction B lattices, in particular $E_8$ and $\Lambda_{16}$.

III. ALGORITHM FOR LABELING CONSTRUCTION A LATTICES

As was discussed in Section II, Construction A lattices form a set of lattices which can be constructed from binary linear block codes. A formula representing this construction is $$L_n = C + 2Z^n \tag{20}$$

where $C = (n, k, d)$ is a binary linear block code, or $$L_n = \bigcup_{i=0}^{2^k-1} (2Z^n + c_i) \tag{21}$$

where $c_i \in C = (n,k,d)$, $0 \le i \le 2^k - 1$. Several lattices fall in this category, such as $D_n(n \ge 2)$ and the Gossert lattice $E_8$. One may consider applying the labeling algorithm for $Z^n$ and then combining it with the index $i$ for the coset $(2Z^n + c_i)$ for labeling Construction A lattices. However, after further examination, we have found that waste of bits is inevitable by using this labeling scheme. The brief explanation is as follows: If given a vector $y \in L_n$ on a pyramid of norm $m$, where $L_n$ is a Construction A lattice, then $y = c + 2x$, $c \in C$ and $x \in Z^n$, and $\|y\| = \sum_{i=1}^n |y_i| = \sum_{i=1}^n |c_i + 2x_i| = m$. By the relation of $2|x_i| - c_i \le |2x_i + c_i| \le 2|x_i| + c_i$, and $c_i \in \{0,1\}$, we further have $2\|x\| - n \le m \le 2\|x\| + n$ and $\lfloor (m-n)/2 \rfloor \le \|x\| \le \lceil (m+n)/2 \rceil$, which means the norm of $x$ ranges from $\lfloor (m-n)/2 \rfloor$ to $\lceil (m+n)/2 \rceil$.

In this section, we introduce a labeling algorithm which can label pyramid codewords of Construction A lattices to any dimension and norm without bit waste. First, algorithms for labeling the subset $P^n$ of $Z^n$ lattice and a translation of $2Z^n$, denoted as $O^n$, are introduced. Then, we develop the labeling algorithm for Construction A lattices. Furthermore, as a special example, we apply the algorithms to the Gossert lattice $E_8$.

A. *Labeling the Subset $P^n$ of $Z^n$ Lattice*

Define $$P^n = \{x = (x_1, x_2, ..., x_n) \in Z^n | x_i \ge 0 \text{ for } 1 \le i \le n\} \qquad (22)$$

Obviously, $P^n$ is the non-negative subset of $Z^n$.

First we can derive a recursive formula for calculating the size of $S_p(n,m)$, the set of pyramid codewords of norm $m$ of $P^n$, i.e., $$S_p(n,m) = \{x = (x_1, x_2, ..., x_n) \in Z^n | \sum_{i=1}^n |x_i| = m, \text{ and } x_i \ge 0\}. \qquad (23)$$

Suppose the size of $S_p(n,m)$ is $N_p(n,m)$, then we have $$\begin{aligned} N_p(n,m) &= N_p(n-1,m) + N_p(n-1,m-1) \\ &\quad + \cdots + N_p(n-1,1) + N_p(n-1,0) \end{aligned} \qquad (24)$$

$$\begin{aligned} N_p(n,m-1) &= N_p(n-1,m-1) + N_p(n-1,m-2) \\ &\quad + \cdots + N_p(n-1,1) + N_p(n-1,0). \end{aligned} \qquad (25)$$

From above two equations, we have the following recursive formula $$N_p(n,m) = N_p(n-1,m) + N_p(n,m-1) \tag{26}$$

with initialization $$N_p(n,0) = 1 \ for \ n \geq 0 \tag{27}$$

$$N_p(0,m) = 0 \ for \ m \geq 1 \tag{28}$$

The labeling algorithm for $P^n$ is similar to Algorithm (1). Outlines of the labeling and decoding procedures are given in Algorithm (2) below.

Algorithm (2)(for labeling $P^n$)

Assume all $N_p(l,k)$ for $0 \leq l \leq n$, $0 \leq k \leq m$ are pre-calculated or stored.

*a) Labeling Procedure*

(0). Input $x \in S_p(n,m)$. Set $index = 0$, $i = 1$, $k = m$, $l = n$.

(1).

if $x_i = 0$,     then $index = index + 0$, if $x_i = 1$,     then $index = index + N_p(l-1,k)$ if $x_i > 1$,     then $index = index + N_p(l-1,k)$ $+ \sum_{j=1}^{x_i-1} N_p(l-1,k-j)$, (2). Update $k \leftarrow k - x_i$, $l \leftarrow l - 1$ and $i \leftarrow i + 1$.

(3). If $k = 0$, then output $index$ and stop; otherwise, go to (1).

*b) Decoding Procedure*

(0). Input $index$. Set $\hat{x} = 0$, $i = 1$, $acc = 0$, $k = m$, $l = n$.

(1). If $index = acc$, then $\hat{x}_i = 0$, go to (4).

(2). If $index < acc + N_p(l-1,k)$, then $\hat{x}_i = 0$, go to (4).

Otherwise, $acc = acc + N_p(l-1,k)$; set $j = 1$.

(3). If $index < acc + N_p(l-1,k-j)$, then $\hat{x}_i = j$;

otherwise, $acc = acc + N_p(l-1,k-j)$; $j = j + 1$, go back to (3).

(4). Update $k \leftarrow k - \hat{x}_i$, $l \leftarrow l - 1$ and $i \leftarrow i + 1$.

If $l > 0$, go to (1); otherwise, go to (5).

(5). If $k > 0$, then $\hat{x}_n = k - \hat{x}_i$.

(6). Output $\hat{x} = (\hat{x}_1, \hat{x}_2, ..., \hat{x}_n)$, and stop.

We here give a simple example.

Example 2a: Obtain the index of a pyramid codeword $x = (0, 0, 1, 0, 1, 2, 0, 1) \in S_p(8, 5)$.

By computation, $N_p(5,5) = 126$, $N_p(3,4) = 15$, $N_p(2,3) = 4$, $N_p(2,2) = 3$, $N_p(0,0) = 1$.

(0). Set $index = 0$; $i = 1$; $k = 5$ and $l = 8$.

(1). Since $x_1 = 0, x_2 = 0$, $index = 0$.

(2). $i = 3, k = 5, l = 6$.

Go back to (1).

(1). $x_3 = 1$, so $index = 0 + N_p(5,5) = 126$.

(2). $i = 4, k = 4, l = 5$.

Go back to (1).

(1). $x_4 = 0$, so $index = 0 + 126 = 126$.

(2). $i = 5, k = 4, l = 4$.

Go back to (1).

(1). $x_5 = 1$, so $index = 126 + N_p(3,4) = 126 + 15 = 141$.

(2). $i = 6, k = 3, l = 3$.

Go back to (1).

(1). $x_6 = 2$, so $index = 141 + N_p(2,3) + N_p(2,2) = 141 + 4 + 3 = 148$.

(2). $i = 7, k = 1, l = 2$.

Go back to (1).

(1). $x_7 = 0$, so $index = 0 + 148 = 148$.

(2). $i = 8, k = 0, l = 1$.

Go back to (1).

(1). $x_8 = 1$, so $index = 148 + N_p(0,0) = 149$.

(2). Output $index = 149$, and stop.

Example 2b: Given $index = 149$, find a pyramid codeword $\hat{x} \in S_p(8,5)$. By computation, $N_p(7,5) = 462, N_p(6,5) = 252, N_p(5,5) = 126,\ N_p(5,4) = 70,\ N_p(4,4) = 35,\ N_p(3,4) = 15,$ $N_p(3,3) = 10,\ N_p(2,3) = 4,\ N_p(2,2) = 3,\ N_p(1,1) = N_p(1,0) = 1.$ (0). Set $\hat{x} = 0$, $i = 1$, $acc = 0$, $k = 5$, $l = 8$.

(1). Since $index \neq acc$, go to (2).

(2). Since $index = 149 < 0 + N_p(7,5) = 462$, $\hat{x}_1 = 0$, go to (4).

(4). Update $k = 5$, $l = 7$ and $i = 2$.

Go to (1).

(1). Since $index \neq acc$, go to (2).

(2). Since $index = 149 < 0 + N_p(6,5) = 252$, $\hat{x}_2 = 0$, go to (4).

(4). Update $k = 5$, $l = 6$ and $i = 3$.

Go to (1).

(1). Since $index \neq acc$, go to (2).

(2). Since $index = 149 > 0 + N_p(5,5) = 126$, $acc = 0 + 126 = 126$, and $j = 1$.

(3). Since $index = 149 < 126 + N_p(5,4) = 196$, $\hat{x}_3 = 1$.

(4). Update $k = 4$, $l = 5$ and $i = 4$.

Go to (1).

(1). Since $index = 149 \neq acc = 126$, go to (2).

(2). Since $index = 149 < 126 + N_p(4,4) = 171$, $\hat{x}_4 = 0$, go to (4).

(4). Update $k = 4$, $l = 4$ and $i = 5$.

Go to (1).

(1). Since $index = 149 \neq acc = 126$, go to (2).

(2). Since $index = 149 > 126 + N_p(3,4) = 141$, $acc = 126 + 15 = 141$, and $j = 1$.

(3). Since $index = 149 < 141 + N_p(3,3) = 151$, $\hat{x}_5 = 1$.

(4). Update $k = 3$, $l = 3$ and $i = 6$.

Go to (1).

(1). Since $index = 149 \neq acc = 141$, go to (2).

(2). Sicne $index = 149 > 141 + N_p(2,3) = 145$, $acc = 141 + 4 = 145$, and $j = 1$.

(3). Since $index = 149 > 145 + N_p(2,2) = 148$, $acc = 145 + 3 = 148$, and $j = 2$, go back to (3).

(3). Since $index = 149 < 148 + N_p(2,1) = 150$, $\hat{x}_6 = 2$.

(4). Update $k = 1$, $l = 2$ and $i = 7$.

Go to (1).

(1). Since $index = 149 \neq acc = 148$, go to (2).

(2). Since $index = 148 + N_p(1,1) = 149$, $acc = 148 + 1 = 149$, and $j = 1$.

(3). Since $index = 149 < 149 + N_p(1,0) = 150$, $\hat{x}_7 = 1$.

(4). Update $k = 0$, $l = 1$ and $i = 8$.

Go to (1).

(1). Since $index = 149 = acc = 149$, $\hat{x}_8 = 0$, go to (5).

(5). Output $\hat{x} = (0, 0, 1, 0, 1, 2, 0, 1)$, and stop.

B. *Labeling $O^n$ on Pyramid*

Define a set $O^n$:

$$O^n = \{y = (y_1, y_2, ..., y_n) \in Z^n \mid y_i \text{ odd}, 1 \leq i \leq n\} \tag{29}$$

Obviously, $O^n = 2Z^n + \{1\}^n$, where, $\{1\}^n = \{(1, 1, ..., 1)\}$. Clearly, $O^n$ is a translation of $2Z^n$.

Let $\mathcal{O}$ be a mapping from the set of odd integers to the set of non-negative integers, i.e., $$\mathcal{O}(y) = (|y| - 1)/2, \quad for \ y = \pm 1, \pm 3, \pm 5, ... \tag{30}$$

Thus, a mapping $\mathcal{O}_n$ can be defined from $O^n$ to $P^n$, i.e., $$\forall y \in O^n, \tilde{y} = \mathcal{O}_n(y) = (\mathcal{O}(y_1), \mathcal{O}(y_2), ..., \mathcal{O}(y_n)) \in P^n \tag{31}$$

Obviously this is not a one-to-one mapping. As a matter of fact, all the $2^n$ vectors $y = (y_1, y_2, ..., y_n)$ with $y_i \in \{+|y_i|, -|y_i|\}, 1 \leq i \leq n$, are all mapped to the vector $(\frac{|y_1|-1}{2}, \frac{|y_2|-1}{2}, ..., \frac{|y_n|-1}{2})$. Therefore, to obtain an index of a vector $y \in O^n$ on a pyramid of norm $m$, denoted as $S_O(n, m)$ for $m \geq n$, we need to know two indices. One is the index of $\tilde{y} \in P^n$, namely $index_p(\tilde{y})$, the other is $index_{pm}(y)$ (to be defined next). Then the index of $y$ can be obtained as $index(y) = index_p(\tilde{y}) * 2^n + index_{pm}(y)$. Clearly, $index_p(\bar{y})$ can be obtained by applying Algorithm (2). Also, $index_{pm}(y)$ can be easily derived as follows: Define a one-to-one mapping $\mathcal{B}_n$ from $y$ to a binary $n$-tuples $b$, where $y_i$ is mapped to "0" if $y_i > 0$, and $y_i$ to "1" if $y_i < 0$, for $1 \leq i \leq n$. A binary $n$-tuple can represent an integer in $\{0, 1, ..., 2^n - 1\}$ by binary coded decimal (BCD) representation. Thus, $index_{pm}(y) \in \{0, 1, ..., 2^n - 1\}$. Table IV shows the index partition for the pyramid codewords of $O^n$. From Table IV we also can conclude that the size of $S_O(n,m)$ is $N_O(n,m) = N_p(n,(m-n)/2)2^n$ for $m \geq n$.

TABLE IV

PARTITION OF INDEX OF $y \in O^n$

| $index_p(\tilde{y})$ | $index_{pm}(y)$ | $index(y)$ |
|---|---|---|
| 0 | 0 ↓ $2^n - 1$ | 0 ↓ $2^n - 1$ |
| 1 | 0 ↓ $2^n - 1$ | $2^n$ ↓ $2 \cdot 2^n - 1$ |
| ⋮ | ⋮ | ⋮ |
| $N_p(n,(m-n)/2) - 1$ | 0 ↓ $2^n - 1$ | $(N_p(n,(m-n)/2) - 1)2^n$ ↓ $N_p(n,(m-n)/2)2^n - 1$ |

Therefore, we now have the labeling algorithm for $O^n$.

Algorithm (3)(for labeling $O^n$)

a) *Labeling Procedure*

(0). Input $y \in S_O(n,m)$.

(1). Map $y$ to $\tilde{y} \in P^n$ by $\mathcal{O}_n$ mapping. Apply the labeling procedure of Algorithm (2) to obtain the the index of $\tilde{y}$, denoted as $index_p(\tilde{y})$.

(2). Map $y$ to a binary vector $b = (b_1, b_2, ..., b_n)$ by $\mathcal{B}_n$ mapping. Then $index_{pm}(y) = \sum_{i=1}^{n} b_i 2^{n-i}$.

(3). Output $index(y) = index_p(\tilde{y}) * 2^n + index_{pm}(y)$, and stop.

b) *Decoding Procedure*

(0). Input $index$. Set $acc = 0$ and $j = 0$.

(1). If $index < acc + 2^n$, then $index_p(\tilde{y}) = j$ and apply the decoding procedure of Algorithm (2) to obtain $\tilde{y}$.

Otherwise, $j = j + 1$ and $acc = acc + 2^n$, go back to (1).

(2). Obtain $index_{pm}(y) = index - acc$, and represent this $index_{pm}(y)$ as a binary vector $b = (b_1, b_2, ..., b_n)$.

(3). For $1 \leq i \leq n$, if $b_i = 0$, then $y_i = 2\tilde{y}_i + 1$; otherwise, $y_i = -2\tilde{y}_i - 1$.

(4). Output $y = (y_1, y_2, ..., y_n)$, and stop.

Example 3a: Given $y = (+1, -1, -3, +1, +3, -5, +1, -3) \in S_O(8, 18)$. Obtain the index of $y$.

(1). Map $y$ to $\tilde{y} = (0, 0, 1, 0, 1, 2, 0, 1) \in P^8$ by applying $\mathcal{O}_n$ mapping. Apply the labeling procedure of Algorithm (2) and obtain $index_p(\tilde{y}) = 149$ (as shown in Example 2a).

(2). Map $y$ to $b = (0, 1, 1, 0, 0, 1, 0, 1)$ by $\mathcal{E}_n$ mapping, then $index_{pm}(y) = 99$.

(3). Output $index(y) = 149 * 2^8 + 99 = 38243$, and stop.

Example 3b: Given $index = 38243$, find a pyramid codeword $y \in S_O(8, 18)$, .

(0). Set $acc = 0$.

(1). Since $index > acc + 150 * 256 = 38400$, we have $index_p(\tilde{y}) = 149$ and $acc = 149 * 256 = 38144$. Then apply the decoding procedure of Algorithm (2) to obtain $\tilde{y} = (0, 0, 1, 0, 1, 2, 0, 1)$.

(2). Obtain $index_{pm}(y) = 38243 - 38144 = 99$, and represent this $index_{pm}(y)$ as a binary vector $b = (0, 1, 1, 0, 0, 1, 0, 1)$.

(3). Output $y = (1, -1, -3, 1, 3, -5, 1, -3)$, and stop.

*C. Algorithm for Labeling Construction A Lattices*

The basic idea of labeling Construction A lattices on pyramid is to define an order for the lattice points on a pyramid. The ordering criteria will be introduced in *Criteria (1)-(3)*. Then according to this ordering, we can obtain the index for every lattice point on that pyramid.

Let $S_A(n, m)$ denote the set of $n$-dimensional Construction A lattice points on a pyramid of norm $m$. Since there are total $N_A(n, m)$ such vectors of $S_A(n, m)$, the entire range of the index is $\{0, 1, ..., N_A(n, m) - 1\}$.

Assume the associated binary linear block code of the lattice is $C = (n, k, d)$, and let $A(z) = \sum_{i=0}^{q} A_{w_i} z^{w_i}$ be the weight enumerator of $C$, where, $A_{w_i} \neq 0$ denotes the number of codewords of weight $w_i$. So there are total $q + 1$ possible weights $0 = w_0 < w_1 < \cdots < w_q$ for $C$, and the $2^k$ codewords are partitioned into $q+1$ groups of codewords based on their weights. Obviously, $\sum_{i=0}^{q} A_{w_i} = 2^k$. It is clear that there is only one codeword of weight zero – the all zero codeword, i.e., $A_{w_0} = A_0 = 1$. For $w_i \neq 0$, the $A_{w_i}$ codewords of weight $w_i$ are arbitrarily ordered from 0 to $A_{w_i} - 1$. Therefore we have the first ordering criterion:

*Criterion (1):* For $y_1, y_2 \in S_A(n,m)$ where $y_1 = c_1 + 2x_1$ and $y_2 = c_2 + 2x_2$, $c_1, c_2 \in C$ and $x_1, x_2 \in Z^n$, let $index(y_1) < index(y_2)$ if either 1. $wt(c_1) < wt(c_2)$ or 2. $wt(c_1) = wt(c_2) = w$, but $c_1$ proceeds $c_2$ in order, namely, $order(c_1) < order(c_2)$ where $wt(c)$ denotes the weight of $c$. For the second condition, the most straightforward method is to use a table to store these codewords and their associated order. For decoding, a table–lookup operation has to be employed. But, for some specific codes such as $(8,4,4)$ code associated with $E_8$, there is a method which can be used to directly obtain the order of the codewords, and thus no table is needed. We will discuss this in the next subsection.

We now proceed to define the next criteria. Consider $y = c + 2x \in S_A(n,m)$. If $wt(c) = 0$, then $c = (0,...,0)$ and $y = 2x$. Since $x$ belongs to $Z^n$, we can employ the labeling procedure of Algorithm (1) to obtain the index of $y$ using the index of $x$ in $S_Z(n, m/2)$. If $wt(c) = w \neq 0$, let the coordinates $y_i$ of $y$ where $c_i = 0$ form a vector $y^0$, and let the coordinates $y_i$ of $y$ where $c_i = 1$ form a vector $y^1$. Obviously, the dimension of $y^0$ is $n - w$ and the corresponding coordinates of $x$ and $c$ form vectors $x^0$ and $c^0$, so that $y^0 = 2x^0 + c^0 = 2x^0$, and the dimension of $y^1$ is $w$ and $y^1 = 2x^1 + c^1 = 2x^1 + \{1\}^w$. Clearly, $y^0/2 \in Z^{n-w}$ and $y^1 \in O^w$.

Thus, since the norm of $y$ is $m$ and $m = \|y\| = \|y^0\| + \|y^1\| = m_0 + m_1$, where $m_0$ is even and $m_1 \geq w$, we should consider all the possible values $m_0$ and $m_1$ so that $m_0 + m_1 = m$ can hold. Table V shows all the possible combinations.

Based on the above discussion we have the following two ordering criteria:

*Criterion (2):* For $y_1, y_2 \in S_A(n,m)$, let $index(y_1) < index(y_2)$, if $$c_1 = c_2, \quad and \quad wt(c_1) = wt(c_2) = w \neq 0$$
$$but \quad index(x_1^0) < index(x_2^0)$$

TABLE V

COMBINATIONS FOR $m = m_0 + m_1$

| $m_0$ | $m_1$ |
|---|---|
| 0 | $m$ |
| 2 | $m - 2$ |
| 4 | $m - 4$ |
| $\vdots$ | $\vdots$ |
| $m - w$ | $w$ |

*Criterion (3):* For $y_1, y_2 \in S_A(n, m)$, let $index(y_1) < index(y_2)$, if $$c_1 = c_2, \quad and \quad wt(c_1) = wt(c_2) = w \neq 0,$$
$$and \ index(x_1^0) = index(x_2^0),$$
$$but \quad index(x_1^1) < index(x_2^1)$$

With these three criteria, we can now derive a partition of the index range based on the order of the pyramid codewords of $S_A(n, m)$. For the set of the pyramid codewords of norm $m$ associated with a binary codeword of weight $w \leq m$, there are $(m - w)/2 + 1$ possible norm combinations for the pyramid codewords according to Table V. Therefore, the index range for these pyramid codewords can be partitioned into $(m - w)/2 + 1$ subranges. Then each subrange defined by $(m_0, m_1)$, where $m_0 + m_1 = m$, can be further partitioned into $N_Z(n - w, m_0/2)$ sub-subranges. Finally, within each sub-subrange, we have $N_O(w, m_1)$ indices of $\{0, 1, ..., N_O(w, m_1) - 1\}$. The index partitions for pyramid codewords associated with a binary codeword $c_w^{(i)}$ of weight $w \neq 0$ is shown in Table VI, where $I(m, w) = \sum_{k=0}^{(m-w)/2} N_Z(n - w, k) N_O(w, m - 2k)$. Furthermore, Table VII shows the partition of the entire index range for all pyramid codewords of $S_A(n, m)$ according to the weight of the binary codewords.

TABLE VI

INDEX OF PYRAMID CODEWORDS $y$ ASSOCIATED WITH $c_w^{(i)}$ OF $wt(c_w^{(i)}) = w \neq 0$

| $i$ — th codeword of weight $w$ | norm combination $(m_0 + m_1)$ | index of $y^0$ for $\|y^0\| = m_0$ | index of $y^1$ for $\|y^1\| = m_1$ | index of $y$ in $c_w^{(i)}$ |
|---|---|---|---|---|
| $c_w^{(i)}$ | $(0 + m)$ | 0 | 0 ↓ $N_O(w, m) - 1$ | 0 |
| | $(2 + (m-2))$ | 0 | 0 ↓ $N_O(w, m-2) - 1$ | |
| | | 1 | $N_O(w, m-2)$ ↓ $2N_O(w, m-2) - 1$ | ⇓ |
| | | ⋮ | ⋮ | |
| | | $N_Z(n-w, 1) - 1$ | $N_Z(n-w, 1)N_O(w, m-2)$ $-N_O(w, m-2)$ ↓ $N_Z(n-w, 1)N_O(w, m-2) - 1$ | |
| | ⋮ | ⋮ | | |
| | $((m-w) + w)$ | 0 | 0 ↓ $N_O(w, w) - 1$ | |
| | | 1 | $N_O(w, w)$ ↓ $2N_O(w, w) - 1$ | |
| | | ⋮ | ⋮ | |
| | | $N_Z(n-w, (m-w)/2) - 1$ | $N_Z(n-w, (m-w)/2)N_O(w, w)$ $-N_O(w, w)$ ↓ $N_Z(n-w, (m-w)/2)N_O(w, w) - 1$ | $I(m, w) - 1$ |

Accordingly, we have Algorithm (4) to summarize the above labeling and decoding procedures for Construction A lattices.

Algorithm (4) (for labeling Construction A lattices)

Suppose all $N_Z(l_0, k_0), N_O(l_1, k_1)$ for $0 \leq l_0 \leq n - w, 0 \leq k_0 \leq (m-w)/2$, and $0 \leq l_1 \leq w, 0 \leq k_1 \leq m - w$ are known.

*a) Labeling Procedure*

(0). Input $y \in S_A(n, m)$. Set $index(y) = 0$.

(1). If $wt(c) = 0$, apply the labeling procedure of Algorithm (1) to $\frac{1}{2}y \in S_Z(n, m/2)$ to

TABLE VII

INDEX PARTITION

| weight of codeword | codeword | index within the codeword | entire index |
|---|---|---|---|
| $w_0 = 0$ | $c^{(0)} = (0, ..., 0)$ | 0 ↓ $N_Z(n, m/2) - 1$ | 0 ↓ $N_Z(n, m/2) - 1$ |
| $w_1$ | $c_{w_1}^{(0)}$ | 0 ↓ $I(m, w_1) - 1$ | $N_Z(n, m/2)$ ↓ $N_Z(n, m/2) + I(m, w_1) - 1$ |
| | ⋮ | ⋮ | ⋮ |
| | $c_{w_1}^{(A_{w_1} - 1)}$ | $(A_{w_1} - 1)I(m, w_1)$ ↓ $A_{w_1} I(m, w_1) - 1$ | $N_Z(n, m/2) + (A_{w_1} - 1)I(m, w_1)$ ↓ $N_Z(n, m/2) + A_{w_1} I(m, w_1) - 1$ |
| $w_2$ | $c_{w_2}^{(0)}$ | 0 ↓ $I(m, w_2) - 1$ | $N_Z(n, m/2) + A_{w_1} I(m, w_1)$ ↓ $N_Z(n, m/2) + A_{w_1} I(m, w_1) + I(m, w_2) - 1$ |
| | ⋮ | ⋮ | ⋮ |
| | $c_{w_2}^{(A_{w_2} - 1)}$ | $(A_{w_2} - 1)I(m, w_2)$ ↓ $A_{w_2} I(m, w_2) - 1$ | $N_Z(n, m/2) + A_{w_1} I(m, w_1) + (A_{w_2} - 1)I(m, w_2)$ ↓ $N_Z(n, m/2) + A_{w_1} I(m, w_1) + A_{w_2} I(m, w_2) - 1$ |
| ⋮ | ⋮ | ⋮ | ⋮ |
| $w_q$ | $c_{w_q}^{(0)}$ | 0 ↓ $I(m, w_q) - 1$ | $N_Z(n, m/2) + \sum_{j=1}^{q-1} A_{w_j} I(m, w_j)$ ↓ $N_Z(n, m/2) + \sum_{j=1}^{q-1} A_{w_j} I(m, w_j) + I(m, w_q) - 1$ |
| | ⋮ | ⋮ | ⋮ |
| | $c_{w_q}^{(A_{w_q} - 1)}$ | $(A_{w_q} - 1)I(m, w_q)$ ↓ $A_{w_q} I(m, w_q) - 1$ | $N_Z(n, m/2) + \sum_{j=1}^{q} A_{w_j} I(m, w_j) - I(m, w_q)$ ↓ $N_Z(n, m/2) + \sum_{j=1}^{q} A_{w_j} I(m, w_j) - 1$ | obtain the $index(y)$, and go to (5).

Otherwise, if $wt(c) = w_i \neq 0, 1 \leq i \leq q$, obtain $order(c)$, and calculate $I(m, w_j)$ for $1 \leq j < i$, then $index(y) = index(y) + N_Z(n, m/2) + \sum_{j=1}^{i-1} A_{w_j} I(m, w_j) + order(c) I(m, w_i)$.

(2). Divide $y$ into two vectors: $y^0 \in 2Z^{n-w_i}$ and $y^1 \in O^{w_i}$, and obtain $x^0$ and $x^1$ accordingly. Then, if $m_0 = \|y^0\|$ and $m_1 = \|y^1\|$, then $index(y) = index(y) + \sum_{k=0}^{m_0/2-1} N_Z(n - w_i, k) N_O(w_i, m - 2k)$.

(3). Apply the labeling procedure of Algorithm (1) to obtain $index_Z(y^0)$ of $y^0 \in S_Z(n - w_i, m_0/2)$. Then $index(y) = index(y) + index_Z(y^0) N_O(w_i, m_1)$.

(4). Apply the labeling procedure of Algorithm (3) to obtain $index_O(y^1)$ of $y^1 \in S_O(w_i, m_1)$.

Then $index(y) = index(y) + index_O(y^1)$.

(5). Output $index(y)$, and stop.

*b) Decoding Procedure*

(0). Input $index$. Set $\hat{y} = 0$, $acc = 0$.

(1). If $index < N_Z(n, m/2)$, then $wt(\hat{c}) = 0$. Apply the decoding procedure of Algorithm (1) to obtain $\hat{x}$, then $\hat{y} = 2\hat{x}$, go to (9).

Otherwise, $acc = acc + N_Z(n, m/2)$, set $i = 1$.

(2). If $index < acc + A_{w_i} I(m, w_i)$, then $wt(\hat{c}) = w_i$, set $j = 0$.

Otherwise, $i = i + 1$, and $acc = acc + A_{w_i} I(m, w_i)$, go back to (2).

(3). If $index < acc + I(m, w_i)$, then $order(\hat{c}) = j$ and obtain $\hat{c}$. Set $k = 0$, go to (4).

Otherwise, $j = j + 1$, and $acc = acc + I(m, w_i)$, go back to (3).

(4). If $index < acc + N_Z(n - w_i, k) N_O(w_i, m - 2k)$, then $m_0 = 2k$ and $m_1 = m - 2k$. Set $j = 0$, go to (5).

Otherwise, $k = k + 1$, $acc = acc + N_Z(n - w_i, k) N_O(w_i, m - 2k)$, go back to (4).

(5). If $index < acc + N_O(w_i, m_1)$, then $index_Z(\hat{y}^0) = j$, and go to (7).

Otherwise, $j = j + 1$ and $acc = acc + N_O(w_i, m_1)$, go back to (5).

(6). Based on $index_Z(\hat{y}^0)$, apply the decoding procedure of Algorithm (1) to obtain $\hat{x}^0$. Then $\hat{y}^0 = 2\hat{x}^0$.

(7). Obtain $index_O(\hat{y}^1) = index - acc$, and apply the decoding procedure of Algorithm (3) obtain $\hat{y}^1$.

(8). For $1 \leq i \leq n$, if $\hat{c}_i = 0$, then $\hat{y}_i = \hat{y}_i^0$; otherwise, $\hat{y}_i = \hat{y}_i^1$.

(9). Output $\hat{y} = (\hat{y}_1, ..., \hat{y}_n)$, and stop.

Next, we apply this algorithm to label the Gossert lattice $E_8$.

*D. Labeling Gossert Lattice $E_8$*

It is known that $E_8$ falls in the category of Construction A lattices, and its associated binary code is $C = (8, 4, 4)$. Therefore, we have $$\forall y \in E_8, \exists x \in Z^8 \text{ and } c \in (8, 4, 4), \text{ such that } y = c + 2x$$

Given $y \in E_8$ of norm $m$, we can directly apply Algorithm (4) to label and decode the pyramid codewords of $E_8$.

As mentioned in Section III.C, one advantage for labeling $E_8$ is that a table is not needed for storing all the binary codewords of $C$. We know that the number of codewords of $C$ is 16 and the weight enumerator of $C$ is $A(z) = 1 + 14z^4 + z^8$. Only codewords of weight 4 need to be ordered, and we can directly derive their order via a generator matrix of $C$. Let $$G = \begin{bmatrix} 1 & 1 & 1 & 1 & 1 & 1 & 1 & 1 \\ 0 & 0 & 0 & 0 & 1 & 1 & 1 & 1 \\ 0 & 0 & 1 & 1 & 0 & 0 & 1 & 1 \\ 0 & 1 & 0 & 1 & 0 & 1 & 0 & 1 \end{bmatrix}$$

be a generator matrix of $C$, then a codeword $c = (c_1, c_2, ..., c_8)$ can be generated by a message sequence $m = (m_1, m_2, m_3, m_4)$ such that $$c = mG$$

namely, $$(c_1, c_2, ..., c_8) = (m_1 \ m_2 \ m_3 \ m_4) \begin{bmatrix} 1 & 1 & 1 & 1 & 1 & 1 & 1 & 1 \\ 0 & 0 & 0 & 0 & 1 & 1 & 1 & 1 \\ 0 & 0 & 1 & 1 & 0 & 0 & 1 & 1 \\ 0 & 1 & 0 & 1 & 0 & 1 & 0 & 1 \end{bmatrix}$$

Clearly, every codeword in $C$ is uniquely determined by a message vector $m$, where $m = (0,0,0,0)$ and $m = (1,0,0,0)$ result in weight 0 and weight 8 codeword, respectively. All other $m$ will give codewords of weight 4. To order these 14 codewords of weight 4, we can map $m$ to an integer $0 \leq b(m) \leq 2^4 - 3 = 13$ as:

$$b(m) = \begin{cases} \sum_{i=1}^{4} m_i 2^{4-i} - 1, & if \ m \in \{(0001),(0001),...,(0111)\} \\ \sum_{i=1}^{4} m_i 2^{4-i} - 2, & if \ m \in \{(1001),(1010),...,(1111)\} \end{cases}$$

Example 4: Given a vector $y = (-2, 0, -1, 1, -2, 0, 1, 3) \in E_8$ with norm $m = 10$. Obtain index of $y \in S_A(8, 10)$. Obviously, we can obtain $x = (-1, 0, -1, 0, -1, 0, 0, 1)$ and $c = (0, 0, 1, 1, 0, 0, 1, 1)$.

(0). Set $index(y) = 0$.

(1). Since $wt(c) = 4 = w_1$, obtain $order(c) = 1$, then $I(10,4) = N_Z(4,0)N_O(4,10) + N_Z(4,1)N_O(4,8) + N_Z(4,2)N_O(4,6) + N_Z(4,3)N_O(4,4) = 1*320 + 8*160 + 32*64 + 88*16 = 5056$, $index(y) = 0 + N_Z(8,5) + order(c)*I(10,4) = 9424 + 1*5056 = 14480$.

(2). Divide $y$ into two vectors: $y^0 = (-2,0,-2,0) \in 2Z^4$ and $y^1 = (-1,1,1,3) \in O^4$; $x^0 = (-1,0,-1,0)$ and $x^1 = (-1,0,0,1)$. Also $m_0 = 4$, $m_1 = 6$ and $\|x^0\| = 2$. Then $index(y) = 14480 + N_Z(4,0)N_O(4,10) + N_Z(4,1)N_O(4,8) = 14480 + 1*320 + 8*160 = 16080$.

(3). Apply the labeling procedure of Algorithm (1) and obtain $index_Z(y^0) = 27$, then $index(y) = 16080 + 27*N_O(4,6) = 16080 + 27*64 = 17808$.

(4). Apply the labeling procedure of Algorithm (3) and obtain $index_O(y^1) = 8$, then $index(y) = 17808 + 8 = 17816$.

(5). Output $index(y) = 17816$, and stop.

Similarly, following the decoding procedure of Algorithm (4), we can obtain $\hat{y} = (-2,0,-1,1,-2,0,1,3)$ for $index = 17816$.

A computer program has been written using C language to verify the algorithms developed in this section for labeling Construction A lattices. A partial list for labeling pyramid codewords of norm 10 in $E_8$ is given in Tables VIII-X.

IV. ALGORITHM FOR LABELING CONSTRUCTION B LATTICES

As was discussed in Section II, Construction B lattices form another set of lattices which can be constructed from binary linear block codes. A Construction B lattice can be defined by $$L_n = C + 2D_n$$

where $C = (n, k, d)$ is a doubly even binary linear block code, or $$L_n = \bigcup_{i=0}^{2^k-1} (2D_n + c_i)$$

where $c_i \in C = (n, k, d)$, $0 \leq i \leq 2^k - 1$.

Several very important lattices fall in this category, such as $\Lambda_{16}$, Leech half-lattice $H_{24}$, and the 32-dimensional Barnes-Wall half-lattice $H_{32}$. Following the same argument as for labeling Construction A lattices, wasting of bits is inevitable by direct application of the labeling algorithm for $D_n$. Therefore in this section, we introduce a labeling algorithm which can label all pyramid codewords of Construction B lattices to any dimension and norm. First, an algorithm for labeling two subsets of $O^n$ (defined in Section III.B), denoted as $O^n_{even}$ and $O^n_{odd}$ respectively, is introduced. Then, we derive a labeling algorithm for Construction B lattices. Furthermore, we apply this labeling algorithm to index pyramid codewords of the 16-dimensional Barnes-Wall lattice $\Lambda_{16}$.

A. Labeling $O^n_{even}$ and $O^n_{odd}$

We consider the partition of $O^n$ into $O^n_{even}$ and $O^n_{odd}$, where $$O^n_{even} = \{y = (y_1, y_2, ..., y_n) \in Z^n \mid y_i \text{ odd for } 1 \leq i \leq n,$$
$$\text{and the number of } y_i < 0 \text{ is even}\}$$

and $$O^n_{odd} = \{y = (y_1, y_2, ..., y_n) \in Z^n \mid y_i \text{ odd for } 1 \leq i \leq n,$$
$$\text{and the number of } y_i < 0 \text{ is odd}\}$$

TABLE VIII

A PARTIAL LIST FOR LABELING PYRAMID CODEWORDS OF NORM 10 IN $E_8$

| Index | Codeword |
|---|---|
| 0 | $(0,0,0,0,0,0,0,10)$ |
| 1 | $(0,0,0,0,0,0,0,-10)$ |
| 2 | $(0,0,0,0,0,0,2,8)$ |
| 3 | $(0,0,0,0,0,0,2,-8)$ |
| 4 | $(0,0,0,0,0,0,-2,8)$ |
| 5 | $(0,0,0,0,0,0,-2,-8)$ |
| 6 | $(0,0,0,0,0,0,4,6)$ |
| 7 | $(0,0,0,0,0,0,4,-6)$ |
| 8 | $(0,0,0,0,0,0,-4,6)$ |
| 9 | $(0,0,0,0,0,0,-4,-6)$ |
| 10 | $(0,0,0,0,0,0,6,4)$ |
| 11 | $(0,0,0,0,0,0,6,-4)$ |
| 12 | $(0,0,0,0,0,0,-6,4)$ |
| 13 | $(0,0,0,0,0,0,-6,-4)$ |
| 14 | $(0,0,0,0,0,0,8,2)$ |
| 15 | $(0,0,0,0,0,0,8,-2)$ |
| 16 | $(0,0,0,0,0,0,-8,2)$ |
| 17 | $(0,0,0,0,0,0,-8,-2)$ |
| 18 | $(0,0,0,0,0,0,10,0)$ |
| 19 | $(0,0,0,0,0,0,-10,0)$ |
| $\vdots$ | $\vdots$ |

TABLE IX

A PARTIAL LIST FOR LABELING PYRAMID CODEWORDS OF NORM 10 IN $E_8$ (CONT.)

| Index | Codeword |
|---|---|
| ⋮ | ⋮ |
| 17800 | $(-2, 0, -3, 1, 2, 0, 1, 1)$ |
| 17801 | $(-2, 0, -3, 1, 2, 0, 1, -1)$ |
| 17802 | $(-2, 0, -3, 1, 2, 0, -1, 1)$ |
| 17803 | $(-2, 0, -3, 1, 2, 0, -1, -1)$ |
| 17804 | $(-2, 0, -3, -1, 2, 0, 1, 1)$ |
| 17805 | $(-2, 0, -3, -1, 2, 0, 1, -1)$ |
| 17806 | $(-2, 0, -3, -1, 2, 0, -1, 1)$ |
| 17807 | $(-2, 0, -3, -1, 2, 0, -1, -1)$ |
| 17808 | $(-2, 0, 1, 1, -2, 0, 1, 3)$ |
| 17809 | $(-2, 0, 1, 1, -2, 0, 1, -3)$ |
| 17810 | $(-2, 0, 1, 1, -2, 0, -1, 3)$ |
| 17811 | $(-2, 0, 1, 1, -2, 0, -1, -3)$ |
| 17812 | $(-2, 0, 1, -1, -2, 0, 1, 3)$ |
| 17813 | $(-2, 0, 1, -1, -2, 0, 1, -3)$ |
| 17814 | $(-2, 0, 1, -1, -2, 0, -1, 3)$ |
| 17815 | $(-2, 0, 1, -1, -2, 0, -1, -3)$ |
| 17816 | $(-2, 0, -1, 1, -2, 0, 1, 3)$ |
| 17817 | $(-2, 0, -1, 1, -2, 0, 1, -3)$ |
| 17818 | $(-2, 0, -1, 1, -2, 0, -1, 3)$ |
| 17819 | $(-2, 0, -1, 1, -2, 0, -1, -3)$ |
| ⋮ | ⋮ |

TABLE X

A PARTIAL LIST FOR LABELING PYRAMID CODEWORDS OF NORM 10 IN $E_8$ (CONT.)

| Index | Codeword |
|---|---|
| ⋮ | ⋮ |
| 82226 | $(-3,-1,-1,1,1,1,-1,1)$ |
| 82227 | $(-3,-1,-1,1,1,1,-1,-1)$ |
| 82228 | $(-3,-1,-1,1,1,-1,1,1)$ |
| 82229 | $(-3,-1,-1,1,1,-1,1,-1)$ |
| 82230 | $(-3,-1,-1,1,1,-1,-1,1)$ |
| 82231 | $(-3,-1,-1,1,1,-1,-1,-1)$ |
| 82232 | $(-3,-1,-1,1,-1,1,1,1)$ |
| 82233 | $(-3,-1,-1,1,-1,1,1,-1)$ |
| 82234 | $(-3,-1,-1,1,-1,1,-1,1)$ |
| 82235 | $(-3,-1,-1,1,-1,1,-1,-1)$ |
| 82236 | $(-3,-1,-1,1,-1,-1,1,1)$ |
| 82237 | $(-3,-1,-1,1,-1,-1,1,-1)$ |
| 82238 | $(-3,-1,-1,1,-1,-1,-1,1)$ |
| 82239 | $(-3,-1,-1,1,-1,-1,-1,-1)$ |
| 82240 | $(-3,-1,-1,-1,1,1,1,1)$ |
| 82241 | $(-3,-1,-1,-1,1,1,1,-1)$ |
| 82242 | $(-3,-1,-1,-1,1,1,-1,1)$ |
| 82243 | $(-3,-1,-1,-1,1,1,-1,-1)$ |
| 82244 | $(-3,-1,-1,-1,1,-1,1,1)$ |
| 82245 | $(-3,-1,-1,-1,1,-1,1,-1)$ |
| ⋮ | ⋮ |

In the following we only consider the labeling for $O_{even}^n$. The labeling for $O_{odd}^n$ follows similarly.

To label vectors of $O_{even}^n$ on a pyramid of norm $m$, first we apply the mapping $\mathcal{O}_n$ to map $y \in O_{even}^n$ to $P^n$, i.e., $$\forall y \in O_{even}^n, \tilde{y} = \mathcal{O}_n(y) = (\mathcal{O}(y_1), \mathcal{O}(y_2), ..., \mathcal{O}(y_n))$$
$$= (((|y_1|-1)/2, |y_2|-1)/2, ..., |y_n|-1)/2)$$

Obviously this is not a one-to-one mapping. In fact, all $2^{n-1}$ vectors $y = (y_1, y_2, ..., y_n) \in O_{even}^n$ with $y_i \in \{+|y_i|, -|y_i|\}$, $1 \leq i \leq n$, are all mapped to the vector $(\frac{|y_1|-1}{2}, \frac{|y_2|-1}{2}, ..., \frac{|y_n|-1}{2})$. After this mapping we obtain the index of $\tilde{y} \in P^n$, namely $index_p(\tilde{y})$. Further calculation is needed to obtain $index_{pm}(y)$, described as follows: Define a one-to-one mapping $\mathcal{B}_n$ from $y$ to a binary $n$-tuple $b = (b_1, ..., b_n)$, where $y_i$ is mapped to "0" if $y_i > 0$, and $y_i$ to "1" if $y_i < 0$ for $1 \leq i \leq n$. Since the mapping results in $2^{n-1}$ binary vectors of even weight, we need only use the first $n-1$ bits, namely $b_1, ..., b_{n-1}$, in BCD format to represent $index_{pm}(y)$. Furthermore, the total number of pyramid codewords of $O_{even}^n$ on a pyramid of norm $m$ is $$N_{O_{even}}(n, m) = index_p(\tilde{y})2^{n-1} + index_{pm}(y).$$

We can now summarize the labeling and decoding procedures in Algorithm (5).

Algorithm (5)(for labeling $O_{even}^n$ and $O_{odd}^n$)

*a) Labeling Procedure*

(0). Input $y \in O_{even}^n$ or $y \in O_{odd}^n$.

(1). Map $y$ to $\tilde{y} \in P^n$ by $\mathcal{O}_n$ mapping. Apply the labeling procedure of Algorithm (2) to find the the index of $\tilde{y}$, denoted as $index_p(\tilde{y})$.

(2). Map $y$ to a binary $n$-tuple $b = (b_1, b_2, ..., b_n)$ by $\mathcal{B}_n$ mapping. Convert the $n-1$ bits $b_i, 1 \leq i \leq n-1$ to an integer, i.e., $index_{pm}(y) = \sum_{i=1}^{n-1} b_i 2^{n-1-i}$.

(3). Output the index of $y$ as: $index = index_p(\tilde{y}) * 2^{n-1} + index_{pm}(y)$, and stop.

*b) Decoding Procedure*

(0). Input $index$. Set $acc = 0$ and $j = 0$.

(1). If $index < acc + 2^{n-1}$, then $index_p(\tilde{y}) = j$ and apply the decoding procedure of Algorithm (2) to obtain $\tilde{y} \in P^n$.

Otherwise, $j = j + 1$ and $acc = acc + 2^{n-1}$, go back to (1).

(2). Obtain $index_{pm}(y) = index - acc$, and convert this $index_{pm}(y)$ to $n-1$ bits $b_1, b_2, ..., b_{n-1}$. Then, $b_n = (\sum_{i=1}^{n-1} b_i \mod 2)$ for decoding pyramid codewords in $O_{even}^n$, and $b_n = ((1 + \sum_{i=1}^{n-1} b_i) \mod 2)$ for decoding pyramid codewords in $O_{odd}^n$. Now we have $b = (b_1, b_2, ..., b_{n-1}, b_n)$.

(3). For $1 \leq i \leq n$, if $b_i = 0$, then $y_i = 2\tilde{y}_i + 1$; otherwise, $y_i = -2\tilde{y}_i - 1$.

(4). Output $y = (y_1, y_2, ..., y_n)$, and stop.

B. Labeling Algorithm for Construction B Lattices

The algorithm for labeling Construction B lattices is similar to that for labeling Construction A lattices. The difference between Construction A and Construction B lattices is that for any vector $y = c + 2x$, if $y$ is a lattice point of Construction A lattice, then $x \in Z^n$; if $y$ is a lattice point of Construction B lattice, then $x \in D_n$, namely, $\|x\| = \sum_{i=0}^n |x_i| = even$. As in Algorithm (4), given $y$ as a point of a Construction B lattice, $y$ is divided into two vectors $y^0$ and $y^1$, and the corresponding $x$ is divided into $x^0$ and $x^1$ according to the components of $c$. Then, $y^0 \in 2Z^{n-w}$ and $y^1 \in O_{even}^w$ or $y^1 \in O_{odd}^w$. To determine when $y^1 \in O_{even}^w$ and when $y^1 \in O_{odd}^w$, we have the following argument.

The norm of $x^1$ has to depend on the norm of $x^0$. If $\|x^0\|$ is even, then $\|x^1\|$ should be even too. On the other hand, if $\|x^0\|$ is odd, then $\|x^1\|$ should also be odd.

Suppose the norm of $y^1$ is $m_1$, and the dimension of $y^1$ is $w$ ($w$ is even), then $$\|y\| = \sum_{i=1}^{w} |y_i^1| = \sum_{i=1}^{w} |2x_i^1 + 1| = m_1 \tag{32}$$

Clearly, in above equation, if $x_i^1 < 0$, then $|2x_i^1 + 1| = 2|x_i^1| - 1$, and consequently $y_i^1 < 0$; if $x_i^1 > 0$, then $|2x_i^1 + 1| = 2|x_i^1| + 1$, and thus $y_i^1 > 0$. Let the number of negative components of $y^1 = (y_1^1, y_2^1, ..., y_w^1)$ be $n_-$, then the number of positive components of $y^1$ is $n_+ = u - n_-$. Then Eq. (32) becomes $$2 \sum_{i=1}^{w} |x_i^1| + (w - 2n_-) = m_1 \tag{33}$$

Thus, we have $$\sum_{i=1}^{w} |x_i^1| = \|x^1\| = m_1/2 + n_- - w/2 \tag{34}$$

Therefore, $$\|x^0\| \text{ even} \Rightarrow \|x^1\| \text{ even} \iff \begin{cases} n_- \text{ even} & if \quad (m_1 - w)/2 \text{ even} \\ n_- \text{ odd} & if \quad (m_1 - w)/2 \text{ odd} \end{cases} \quad (35)$$

$$\|x^0\| \text{ odd} \Rightarrow \|x^1\| \text{ odd} \iff \begin{cases} n_- \text{ odd} & if \quad (m_1 - w)/2 \text{ even} \\ n_- \text{ even} & if \quad (m_1 - w)/2 \text{ odd} \end{cases} \quad (36)$$

As a consequence, when $\|x^1\|$ is even, we have $y^1 \in O_{even}^w$ if $(m_1-w)/2$ is even, and $y^1 \in O_{odd}^w$ if $(m_1 - w)/2$ is odd. Similarly, when $\|x^1\|$ is odd, we have $y^1 \in O_{odd}^w$ if $(m_1 - w)/2$ is even, and $y^1 \in O_{even}^w$ if $(m_1 - w)/2$ is odd.

Therefore, to label pyramid codewords of Construction B lattices, we can derive an algorithm similar to algorithm for labeling Construction A lattices.

The algorithm is described in detail as follows:

Algorithm (6)(for labeling Construction B lattices)

Suppose all $N_p(l_0, k_0), N_{O_{even}}(l_1, k_1)$ and $N_{O_{odd}}(l_1, k_1)$ for $0 \le l_0 \le n - w, 0 \le k_0 \le (m - w)/2$, and $0 \le l_1 \le w, 0 \le k_1 \le m - w$ are known.

a) Labeling Procedure (0). Input $y \in S_B(n, m)$. Set $index(y) = 0$.

(1). If $wt(c) = 0$, apply the labeling procedure of Algorithm (1) to $\frac{1}{2}y \in S_Z(n, m/2)$ to obtain $index(y)$, go to (5).

Otherwise, if $wt(c) = w_i \ne 0, 1 \le i \le q$, obtain $order(c)$ among the weight $w_i$ codewords. Calculate $I(m, w_j)$ for $1 \le j < i$, then $index(y) = index(y) + N_Z(n, m/2) + \sum_{j=1}^{i-1} A_{w_j} I(m, w_j) + order(c)I(m, w_i)$.

(2). Divide $y$ into two vectors: $y^0 \in 2Z^{n-w_i}$ and $y^1 \in O_{even}^{w_i}$ or $y^1 \in O_{odd}^{w_i}$ depending on Eq.(35) and (36). Also obtain $x^0$ and $x^1$. Now, if $m_0 = \|y^0\|$ and $m_1 = \|y^1\|$, then $index(y) = index(y) + \sum_{k=0}^{m_0/2-1} N_Z(n - w_i, k) N_O(w_i, m - 2k)/2$, where $N_O(w_i, m - 2k)$ is as defined in Section III.B and $N_{O_{even}}(w_i, m - 2k) = N_{O_{odd}}(w_i, m - 2k) = N_O(w_i, m - 2k)/2$.

(3). Apply the labeling procedure of Algorithm (1) to obtain $index_Z(y^0)$. Then $index(y) = index(y) + index_Z(y^0) N_O(w_i, m_1)/2$.

(4). Apply the labeling procedure of Algorithm (5) to obtain $index_{O_{even}}(y^1)$ or $index_{O_{odd}}(y^0)$.

Then $index(y) = index(y) + index_{O_{even}}(y^1)$ or $index(y) = index(y) + index_{O_{odd}}(y^1)$.

(5). Output $index(y)$, and stop.

*b) Decoding Procedure*

(0). Input $index$. Set $\hat{y} = 0$, $acc = 0$.

(1). If $index < N_Z(n, m/2)$, then $wt(c) = 0$. Apply the decoding procedure of Algorithm (1) to obtain $\hat{x}$, then $\hat{y} = 2\hat{x}$, go to (9).

Otherwise, $acc = acc + N_Z(n, m/2)$, set $i = 1$.

(2). If $index < acc + A_{w_i}I(m, w_i)$, then $wt(\hat{c}) = w_i$, set $j = 0$.

Otherwise, $i = i + 1$, and $acc = acc + A_{w_i}I(m, w_i)$, go back to (2).

(3). If $index < acc + I(m, w_i)$, then $order(\hat{c}) = j$ and obtain $\hat{c}$. Set $k = 0$, go to (4).

Otherwise, $j = j + 1$, and $acc = acc + I(m, w_i)$, go back to (3).

(4). If $index < acc + N_Z(n - w_i, k)N_O(w_i, m - 2k)/2$, then $m_0 = 2k$ and $m_1 = m - 2k$. Set $j = 0$, and go to (5).

Otherwise, $k = k + 1$, $acc = acc + N_Z(n - w_i, k)N_O(w_i, m - 2k)/2$, go back to (4).

(5). If $index < acc + N_O(w_i, m_1)/2$, then $index_Z(\hat{y}^0) = j$, and go to (7).

Otherwise, $j = j + 1$ and $acc = acc + N_O(w_i, m_1)/2$, go back to (5).

(6). Based on $index_Z(\hat{y}^0)$, apply the decoding procedure of Algorithm (1) to obtain $\hat{y}^0 = 2\hat{x}^0$.

(7). Obtain $index_{O_{even}}(\hat{y}^1) = index - acc$ or $index_{O_{odd}}(\hat{y}^1) = index - acc$. Apply the decoding procedure of Algorithm (5) to obtain $\hat{y}^1$.

(8). For $1 \leq i \leq n$, if $\hat{c}_i = 0$, $\hat{y}_i = \hat{y}_i^0$; otherwise, $\hat{y}_i = \hat{y}_i^1$.

(9). Output $\hat{y} = (\hat{y}_1, ..., \hat{y}_n)$, and stop.

Next, we apply Algorithm (6) to labeling pyramid codewords of $\Lambda_{16}$.

*C. Labeling Barnes–Wall Lattice $\Lambda_{16}$*

The 16-dimensional Barnes–Wall lattice $\Lambda_{16}$ is a Construction B lattice. Its associated binary code is $C = (16, 5, 8)$, i.e., $$\forall y \in \Lambda_{16}, \exists x \in D_{16} \text{ and } c \in (16, 5, 8), \text{ such that, } y = c + 2x.$$

For any given vector $y \in \Lambda_{16}$ of norm $m$, we can apply the labeling procedure of Algorithm (6) to label $y$. On the other hand, if given an index of a pyramid codeword of norm $m$, by applying the decoding procedure of Algorithm (6), this pyramid codeword can be found.

The same advantage exists for labeling $\Lambda_{16}$ as for $E_8$, which is that, the table for storing the binary codewords of $C$ can be eliminated. It is known that the number of codewords of $C$ is 32 and the weight enumerator of $C$ is $A(z) = 1 + 30z^8 + z^{16}$. Hence, 30 codewords of weight 8 need to be ordered, and this order can be directly derived via a generator matrix of $C$. Let G be a generate matrix of $C$, where $$G = \begin{bmatrix} 1 & 1 & 1 & 1 & 1 & 1 & 1 & 1 & 1 & 1 & 1 & 1 & 1 & 1 & 1 & 1 \\ 0 & 0 & 0 & 0 & 0 & 0 & 0 & 0 & 1 & 1 & 1 & 1 & 1 & 1 & 1 & 1 \\ 0 & 0 & 0 & 0 & 1 & 1 & 1 & 1 & 0 & 0 & 0 & 0 & 1 & 1 & 1 & 1 \\ 0 & 0 & 1 & 1 & 0 & 0 & 1 & 1 & 0 & 0 & 1 & 1 & 0 & 0 & 1 & 1 \\ 0 & 1 & 0 & 1 & 0 & 1 & 0 & 1 & 0 & 1 & 0 & 1 & 0 & 1 & 0 & 1 \end{bmatrix}$$

then a codeword $c = (c_1, c_2, ..., c_{16})$ can be generated by a message sequence $m = (m_1, m_2, m_3, m_4, m_5)$, such that $$c = (m_1\ m_2\ m_3\ m_4\ m_5) \begin{bmatrix} 1 & 1 & 1 & 1 & 1 & 1 & 1 & 1 & 1 & 1 & 1 & 1 & 1 & 1 & 1 & 1 \\ 0 & 0 & 0 & 0 & 0 & 0 & 0 & 0 & 1 & 1 & 1 & 1 & 1 & 1 & 1 & 1 \\ 0 & 0 & 0 & 0 & 1 & 1 & 1 & 1 & 0 & 0 & 0 & 0 & 1 & 1 & 1 & 1 \\ 0 & 0 & 1 & 1 & 0 & 0 & 1 & 1 & 0 & 0 & 1 & 1 & 0 & 0 & 1 & 1 \\ 0 & 1 & 0 & 1 & 0 & 1 & 0 & 1 & 0 & 1 & 0 & 1 & 0 & 1 & 0 & 1 \end{bmatrix}$$

Apparently, every codeword in $C$ is uniquely determined by a $m$ vector, while $m = (0,0,0,0,0)$ and $m = (1,0,0,0,0)$ will give a weight 0 and weight 16 codeword, respectively. All other $m$ will yield codewords of weight 8. To order these 30 codewords of weight 8, we can map $m$ to an integer $0 \leq b(m) \leq 2^5 - 3 = 29$ by $$b(m) = \begin{cases} \sum_{i=1}^{5} m_i 2^{5-i} - 1, & if\ m \in \{(00001), (00001), ..., (01111)\} \\ \sum_{i=1}^{5} m_i 2^{5-i} - 2, & if\ m \in \{(10001), (10010), ..., (11111)\} \end{cases}$$

Example 5: Given a vector $y = (1,1,-1,1,1,1,1,1,1,1,-1,1,-1,1,-1,1) \in \Lambda_{16}$ with norm $m = 16$. Obtain index of $y \in S_B(16, 16)$. Obviously, we have $$x = (0, 0, -1, 0, 0, 0, 0, 0, 0, 0, -1, 0, -1, 0, -1, 0)$$

$$c = (1,1,1,1,1,1,1,1,1,1,1,1,1,1,1,1).$$

(0). Set $index(y) = 0$.

(1). Since $wt(c) = 16 = w_2$, obtain $order(c) = 0$, then $$I(16,8) = N_Z(8,0)N_O(8,16)/2 + N_Z(8,1)N_O(8,14)/2 + N_Z(8,2)N_O(8,12)/2$$
$$+ N_Z(8,3)N_O(8,10)/2 + N_Z(8,4)N_O(8,8)/2 = 1942784,$$

and, $$index(y) = 0 + N_Z(16,8) + 30 * I(16,8)$$
$$+ order(c) * I(16,16) = 88600064.$$

(2). Obtain $y^1 = y = (1,1,-1,1,1,1,1,1,1,1,-1,1,-1,1,-1,1) \in O_{even}^{16}$. Then $x^1 = (0,0,-1,0,0,0,0,0,0,0,-1,0,-1,0,-1,0)$. Also $m_1 = 16$. Then $index(y) = 88600064 + 0 = 88600064$.

(3). Apply the labeling procedure of Algorithm (5) and obtain $index_{O_{even}}(y^1) = 4117$, then $index(y) = 88600064 + 4117 = 88604181$.

(4). Output $index(y) = 88604181$, and stop.

Similarly, when given $index = 88604181$, we can obtain $y = (1,1,-1,1,1,1,1,1,1,1,-1,1,-1,1,-1,1)$ by applying the decoding procedure of Algorithm (6).

To verify the algorithm for labeling Construction B lattices, a computer program has been written using C language. We here (in Tables XI–XIII) give a partial list for labeling pyramid codewords of norm 16 in $\Lambda_{16}$.

V. GENERALIZED LABELING ALGORITHMS FOR VARIOUS LATTICES ON SPHERES

As mentioned in Section II, sphere is another very important boundary considered in lattice VQ. Based on the algorithms developed in the previous two sections, similar algorithms can be derived for labeling sphere codewords of all those lattices including $Z^n$, $D_n(n \geq 2)$, Construction A lattices (e.g. $E_8$), Construction B lattices (e.g. $\Lambda_{16}$, $H_{24}$, ...). The only difference is that, for spheres, we may not be able to derive recursive formulas for counting lattice points on spheres, therefore in the process of labeling and decoding, we need tables to store those values. A brief discussion follows.

1. *Labeling sphere codewords of $Z^n$ and $D_n(n \geq 2)$*

We still use $S_Z(n, m)$ to denote the $Z^n$ or $D_n(n \geq 2)$ lattice points on a sphere of norm $m$. Following the procedures for pyramid, we partition the entire index range into subranges according to the values of the coordinates of the lattice vector. There is one difference, which is that, for any coordinate $x_i, 1 \leq i \leq n$ of vector $x$, the values $x_i$ can take is from the set $\{0, \pm 1, \pm 2, ..., \pm \lfloor \sqrt{m} \rfloor\}$ instead of from the set $\{0, \pm 1, \pm 2, ..., \pm m\}$. Here, $\lfloor x \rfloor$ represents the largest integer less than or equal to $x$.

2. *Labeling sphere codewords of Construction A and Construction B lattices*

Labeling sphere codewords of Construction A and Construction B lattices is also similar to labeling pyramid codewords for these lattices. Given a vector $y = c + 2x$ of a lattice of either Construction A or Construction B, if $wt(c) = 0$, then $y = 2x$ and the labeling problem is to find index of $x$ on a sphere of norm $m/4$. If $wt(c) = w \neq 0$, then we divide the coordinates of $y$ into two vectors: $y^0 = 2x^0$ and $y^1 = 2x^1$. Then the same procedures as for labeling pyramid codewords follows.

VI. CONCLUSION

We have presented generalized labeling algorithms for indexing several important lattices on pyramids and spheres. The labeling algorithms for Construction A and Construction B lattices developed in this paper have allowed further generalization to labeling lattices that can be built upon Construction A and Construction B lattices. A significant advantage of our labeling algorithms is that every lattice point can be indexed without waste of any single

TABLE XI

A PARTIAL LIST FOR LABELING PYRAMID CODEWORDS OF NORM 16 IN $\Lambda_{16}$

| Index | Codeword |
|---|---|
| 0 | $(0,0,0,0,0,0,0,0,0,0,0,0,0,0,0,16)$ |
| 1 | $(0,0,0,0,0,0,0,0,0,0,0,0,0,0,0,-16)$ |
| 2 | $(0,0,0,0,0,0,0,0,0,0,0,0,0,0,2,14)$ |
| 3 | $(0,0,0,0,0,0,0,0,0,0,0,0,0,0,2,-14)$ |
| 4 | $(0,0,0,0,0,0,0,0,0,0,0,0,0,0,-2,14)$ |
| 5 | $(0,0,0,0,0,0,0,0,0,0,0,0,0,0,-2,-14)$ |
| 6 | $(0,0,0,0,0,0,0,0,0,0,0,0,0,0,4,12)$ |
| 7 | $(0,0,0,0,0,0,0,0,0,0,0,0,0,0,4,-12)$ |
| 8 | $(0,0,0,0,0,0,0,0,0,0,0,0,0,0,-4,12)$ |
| 9 | $(0,0,0,0,0,0,0,0,0,0,0,0,0,0,-4,-12)$ |
| 10 | $(0,0,0,0,0,0,0,0,0,0,0,0,0,0,6,10)$ |
| 11 | $(0,0,0,0,0,0,0,0,0,0,0,0,0,0,6,-10)$ |
| 12 | $(0,0,0,0,0,0,0,0,0,0,0,0,0,0,-6,10)$ |
| 13 | $(0,0,0,0,0,0,0,0,0,0,0,0,0,0,-6,-10)$ |
| 14 | $(0,0,0,0,0,0,0,0,0,0,0,0,0,0,8,8)$ |
| 15 | $(0,0,0,0,0,0,0,0,0,0,0,0,0,0,8,-8)$ |
| 16 | $(0,0,0,0,0,0,0,0,0,0,0,0,0,0,-8,8)$ |
| 17 | $(0,0,0,0,0,0,0,0,0,0,0,0,0,0,-8,-8)$ |
| 18 | $(0,0,0,0,0,0,0,0,0,0,0,0,0,0,10,6)$ |
| 19 | $(0,0,0,0,0,0,0,0,0,0,0,0,0,0,10,-6)$ |
| ⋮ | ⋮ |

TABLE XII

A PARTIAL LIST FOR LABELING PYRAMID CODEWORDS OF NORM 16 IN $\Lambda_{16}$ (CONT.)

| Index | Codeword |
|---|---|
| ⋮ | ⋮ |
| 30316544 | (0, 1, 0, 1, 0, 1, 0, 1, 0, 1, 0, 1, 0, 1, 0, 9) |
| 30316545 | (0, 1, 0, 1, 0, 1, 0, 1, 0, 1, 0, 1, 0, −1, 0, −9) |
| 30316546 | (0, 1, 0, 1, 0, 1, 0, 1, 0, 1, 0, −1, 0, 1, 0, −9) |
| 30316547 | (0, 1, 0, 1, 0, 1, 0, 1, 0, 1, 0, −1, 0, −1, 0, 9) |
| 30316548 | (0, 1, 0, 1, 0, 1, 0, 1, 0, −1, 0, 1, 0, 1, 0, −9) |
| 30316549 | (0, 1, 0, 1, 0, 1, 0, 1, 0, −1, 0, 1, 0, −1, 0, 9) |
| 30316550 | (0, 1, 0, 1, 0, 1, 0, 1, 0, −1, 0, −1, 0, 1, 0, 9) |
| 30316551 | (0, 1, 0, 1, 0, 1, 0, 1, 0, −1, 0, −1, 0, −1, 0, −9) |
| 30316552 | (0, 1, 0, 1, 0, 1, 0, −1, 0, 1, 0, 1, 0, 1, 0, −9) |
| 30316553 | (0, 1, 0, 1, 0, 1, 0, −1, 0, 1, 0, 1, 0, −1, 0, 9) |
| 30316554 | (0, 1, 0, 1, 0, 1, 0, −1, 0, 1, 0, −1, 0, 1, 0, 9) |
| 30316555 | (0, 1, 0, 1, 0, 1, 0, −1, 0, 1, 0, −1, 0, −1, 0, −9) |
| 30316556 | (0, 1, 0, 1, 0, 1, 0, −1, 0, −1, 0, 1, 0, 1, 0, 9) |
| 30316557 | (0, 1, 0, 1, 0, 1, 0, −1, 0, −1, 0, 1, 0, −1, 0, −9) |
| 30316558 | (0, 1, 0, 1, 0, 1, 0, −1, 0, −1, 0, −1, 0, 1, 0, −9) |
| 30316559 | (0, 1, 0, 1, 0, 1, 0, −1, 0, −1, 0, −1, 0, −1, 0, 9) |
| 30316560 | (0, 1, 0, 1, 0, −1, 0, 1, 0, 1, 0, 1, 0, 1, 0, −9) |
| 30316561 | (0, 1, 0, 1, 0, −1, 0, 1, 0, 1, 0, 1, 0, −1, 0, 9) |
| 30316562 | (0, 1, 0, 1, 0, −1, 0, 1, 0, 1, 0, −1, 0, 1, 0, 9) |
| 30316563 | (0, 1, 0, 1, 0, −1, 0, 1, 0, 1, 0, −1, 0, −1, 0, −9) |
| ⋮ | ⋮ |

TABLE XIII

A PARTIAL LIST FOR LABELING PYRAMID CODEWORDS OF NORM 16 IN $\Lambda_{16}$ (CONT.)

| Index | Codeword |
|---|---|
| ⋮ | ⋮ |
| 88604170 | $(1,1,-1,1,1,1,1,1,1,1,1,-1,1,-1,1,-1)$ |
| 88604171 | $(1,1,-1,1,1,1,1,1,1,1,1,-1,1,-1,-1,1)$ |
| 88604172 | $(1,1,-1,1,1,1,1,1,1,1,1,-1,-1,1,1,-1)$ |
| 88604173 | $(1,1,-1,1,1,1,1,1,1,1,1,-1,-1,1,-1,1)$ |
| 88604174 | $(1,1,-1,1,1,1,1,1,1,1,1,-1,-1,-1,1,1)$ |
| 88604175 | $(1,1,-1,1,1,1,1,1,1,1,1,-1,-1,-1,-1,-1)$ |
| 88604176 | $(1,1,-1,1,1,1,1,1,1,1,-1,1,1,1,1,1)$ |
| 88604177 | $(1,1,-1,1,1,1,1,1,1,1,-1,1,1,1,-1,-1)$ |
| 88604178 | $(1,1,-1,1,1,1,1,1,1,1,-1,1,1,-1,1,-1)$ |
| 88604179 | $(1,1,-1,1,1,1,1,1,1,1,-1,1,1,-1,-1,1)$ |
| 88604180 | $(1,1,-1,1,1,1,1,1,1,1,-1,1,-1,1,1,-1)$ |
| 88604181 | $(1,1,-1,1,1,1,1,1,1,1,-1,1,-1,1,-1,1)$ |
| 88604182 | $(1,1,-1,1,1,1,1,1,1,1,-1,1,-1,-1,1,1)$ |
| 88604183 | $(1,1,-1,1,1,1,1,1,1,1,-1,1,-1,-1,-1,-1)$ |
| 88604184 | $(1,1,-1,1,1,1,1,1,1,1,-1,-1,1,1,1,-1)$ |
| 88604185 | $(1,1,-1,1,1,1,1,1,1,1,-1,-1,1,1,-1,1)$ |
| 88604186 | $(1,1,-1,1,1,1,1,1,1,1,-1,-1,1,-1,1,1)$ |
| 88604187 | $(1,1,-1,1,1,1,1,1,1,1,-1,-1,1,-1,-1,-1)$ |
| 88604188 | $(1,1,-1,1,1,1,1,1,1,1,-1,-1,-1,1,1,1)$ |
| 88604189 | $(1,1,-1,1,1,1,1,1,1,1,-1,-1,-1,1,-1,-1)$ |
| ⋮ | ⋮ | bit. In addition, the complexity of these algorithm is very low and the memory requirement is also very small. Therefore, these algorithms make lattice VQ possible for large norm size and large dimension which leads to better performance. Furthermore, due to the duality of quantization and data transmission, we expect to derive similarly efficient algorithms for shaping of constellations from these labeling algorithms.

REFERENCES

[1] J.H.Conway and N. Sloane, "A fast encoding method for lattice codes and quantizers," *IEEE Trans. Inform. Theory*, vol. IT-29, pp. 820–824, Nov. 1983.

[2] R. Laroia and N. Farvardin. "A structured fixed rate vector quantizer derived from a variable length scaler quantizer: Part I and II," *IEEE Trans. Inform. Theory*, vol. 39, pp. 851–876, May 1993.

[3] T. R. Fischer, "A pyramid vector quantizer," *IEEE Trans. Inform. Theory*, vol. IT-32, pp. 568–583, July 1986.

[4] J. Conway and N. J. A. Sloane. *Sphere Packings, Lattices and Groups*. Springer-Verlag, 1991.

[5] F. J. MacWilliams and N. J. A. Sloane, *The Theory of Error-Correcting Codes*. North-Holland Publishing Company, 1978.

[6] M. Barlaud, P. Sole, T. Gaidon. M. Antonini, and P. Mathieu, "Pyramid lattice vector quantization for multiscale image coding," *IEEE Trans. Image Processing*, vol. 3, pp. 367–381, July 1994.

We claim:

1. A method for encoding and decoding an input signal representative of video or audio information, comprising the steps of:

performing encoding that includes:
processing said input signal to produce a sequence of multidimensional vectors representative of said input signal;
implementing a lattice vector quantization procedure on individual vectors of said sequence to identify a lattice point of a lattice that is closest to an individual vector and to obtain an index value representative of a labelling of the identified lattice point;
said lattice vector quantization procedure including a multi-level allocation of groups of reserved indices, and selection of said index value for said individual vector within a group of reserved indices, and said lattice vector quantization procedure also including dividing said individual vector into subvectors of its odd and even components, selecting respective index components for said even and odd components, and combining said even and odd index components to obtain said index;
storing index signals representative of said index values;
reading the stored index signals, and performing decoding thereon to obtain a recovered sequence of vectors, and processing said sequence of vectors to produce an output signal.

2. The method as defined by claim 1, wherein said lattice vector quantization also includes folding said odd subvector component into a vector space having only positive components, processing the folded subvector, providing a further group of reserved indices based on the folded subvector, and determining said odd index component from said further group of indices.

3. The method as defined by claim 1, wherein the lattice of said vector quantization procedure is an $E_8$ lattice.

4. The method as defined by claim 2, wherein the lattice of said vector quantization procedure is an $E_8$ lattice.

5. The method as defined by claim 1, wherein the lattice of said vector quantization procedure is a $\Lambda_{16}$ lattice.

6. The method as defined by claim 2, wherein the lattice of said vector quantization procedure is a $\Lambda_{16}$ lattice.

7. Apparatus for encoding and decoding an input signal representative of video or audio information, comprising:

an encoder that includes:
means for processing said input signal to produce a sequence of multidimensional vectors representative of said input signal;
means for implementing a lattice vector quantization procedure on individual vectors of said sequence to identify a lattice point of a lattice that is closest to an individual vector and for obtaining an index value representative of a labelling of the identified lattice point;
said means for implementing lattice vector quantization including means for implementing multi-level allocation of groups of reserved indices, and means for implementing selection of said index value for said individual vector within a group of reserved indices, said means for implementing lattice quantization further including means for dividing said individual vector into subvectors of its odd and even components, means for selecting respective index components for said even and odd components, and means for combining said even and odd index components to obtain said index;
means for storing index signals representative of said index values;
means for reading the stored index signals, and means for performing decoding thereon to obtain a recovered sequence of vectors, and for processing said sequence of vectors to produce an output signal.

8. Apparatus as defined by claim 7, wherein said means for implementing lattice vector quantization also includes means for folding said odd subvector component into a vector space having only positive components, means for processing the folded vector, means for providing a further group of reserved indices based on the folded vector, and means for determining said odd index value component from said further group of indices.

* * * * *